US011928886B2

(12) United States Patent
Kim

(10) Patent No.: US 11,928,886 B2
(45) Date of Patent: Mar. 12, 2024

(54) ELECTRONIC DEVICE AND METHOD FOR RECOGNIZING FINGERPRINT BY ELECTRONIC DEVICE

(71) Applicant: Samsung Electronics Co., Ltd., Suwon-si (KR)

(72) Inventor: Jinho Kim, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 17/903,674

(22) Filed: Sep. 6, 2022

(65) Prior Publication Data

US 2022/0415079 A1 Dec. 29, 2022

Related U.S. Application Data

(63) Continuation of application No. PCT/KR2021/002130, filed on Feb. 19, 2021.

(30) Foreign Application Priority Data

Mar. 6, 2020 (KR) .......................... 10-2020-0028222

(51) Int. Cl.
*G06V 40/13* (2022.01)
*G06F 21/32* (2013.01)
*G06V 40/12* (2022.01)

(52) U.S. Cl.
CPC .......... *G06V 40/1318* (2022.01); *G06F 21/32* (2013.01); *G06V 40/1324* (2022.01); *G06V 40/1365* (2022.01)

(58) Field of Classification Search
None
See application file for complete search history.

(56) References Cited

U.S. PATENT DOCUMENTS

| 11,048,903 | B2 | 6/2021 | He et al. | |
| 2017/0364763 | A1* | 12/2017 | Jin | ........................ G06F 3/0416 |
| 2018/0005005 | A1 | 1/2018 | He et al. | |

(Continued)

FOREIGN PATENT DOCUMENTS

| KR | 10-2019-0093003 A | 8/2019 |
| KR | 10-2019-0100839 A | 8/2019 |

(Continued)

*Primary Examiner* — Joseph R Haley
(74) *Attorney, Agent, or Firm* — Jefferson IP Law, LLP

(57) ABSTRACT

An electronic device is provided. The electronic device includes a display panel including an image sensor arranged to receive incident light reflected by an external object, a first guide structure arranged between the display panel and the image sensor and configured to change the direction of the incident light which is introduced through a fingerprint recognition area of the display panel, a second guide structure arranged between the first guide structure and the image sensor and configured to change the direction of the incident light which is introduced therein after passing through the first guide structure, and a processor operatively connected to the display panel and the image sensor. According to an embodiment, the electronic device performs fingerprint recognition by acquiring image information through the image sensor on the basis of at least a part of the incident light introduced through the first guide structure and the second guide structure.

20 Claims, 10 Drawing Sheets

(56) References Cited

U.S. PATENT DOCUMENTS

| | | | |
|---|---|---|---|
| 2018/0074627 A1* | 3/2018 | Kong | G06V 40/1318 |
| 2020/0202099 A1* | 6/2020 | Sun | H01L 27/14623 |
| 2021/0151511 A1 | 5/2021 | Kim et al. | |
| 2021/0286963 A1* | 9/2021 | Gao | G06V 40/1318 |
| 2022/0202299 A1* | 6/2022 | Lin | G16H 40/63 |
| 2022/0284726 A1* | 9/2022 | Takei | G06V 10/147 |

FOREIGN PATENT DOCUMENTS

| | | |
|---|---|---|
| KR | 10-2043921 A | 11/2019 |
| KR | 10-2057568 B1 | 12/2019 |
| KR | 10-2020-0002155 A | 1/2020 |

\* cited by examiner

ELECTRONIC DEVICE AND METHOD FOR RECOGNIZING FINGERPRINT BY ELECTRONIC DEVICE

CROSS-REFERENCE TO RELATED APPLICATION(S)

This application is a continuation application, claiming priority under § 365(c), of an International application No. PCT/KR2021/002130, filed on Feb. 19, 2021, which is based on and claims the benefit of a Korean patent application number 10-2020-0028222, filed on Mar. 6, 2020, in the Korean Intellectual Property Office, the disclosure of which is incorporated by reference herein in its entirety.

BACKGROUND

1. Field

The disclosure relates to an electronic device and a fingerprint recognition method thereof.

2. Description of Related Art

Recently, various types of electronic devices have been developed and distributed. In particular, mobile devices having various functions, such as a smartphone, a tablet personal computer (PC), or a wearable device, as well as a conventional desktop PC have come into wide use. Furthermore, recent electronic devices include various types of sensors to perform various functions. In particular, in relation to locking and unlocking, security, and user authentication of an electronic device, many recent electronic devices include an image sensor for recognizing a user's fingerprint.

The above information is presented as background information only to assist with an understanding of the disclosure. No determination has been made, and no assertion is made, as to whether any of the above might be applicable as prior art with regard to the disclosure.

SUMMARY

In electronic devices including an image sensor for fingerprint recognition, the quality of an obtained fingerprint image may be varied or lowered depending on a change in a field of view (FOV) and a distance (height) from a fingerprint recognition target.

Aspects of the disclosure are to address at least the above-mentioned problems and/or disadvantages and to provide at least the advantages described below. Accordingly, an aspect of the disclosure is to provide an electronic device including a fingerprint recognition sensor robust despite a change in a field of view (FOV) and a change in the height of a sample and a method for recognizing a fingerprint by the electronic device.

Additional aspects will be set forth in part in the description which follows and, in part, will be apparent from the description, or may be learned by practice of the presented embodiments.

In accordance with an aspect of the disclosure, an electronic device is provided. The electronic device includes a display panel including at least one light source, an image sensor disposed to receive incident light incident thereon by reflection of light emitted through the at least one light source by an object external to the electronic device, a first guide structure that is disposed between the display panel and the image sensor and that changes a direction of the incident light incident through a fingerprint recognition region of the display panel, a second guide structure that is disposed between the first guide structure and the image sensor and that changes the direction of the incident light incident through the first guide structure, and a processor operationally connected with the display panel and the image sensor. The processor is configured to obtain image information through the image sensor, based on at least a portion of the incident light incident through the first guide structure and the second guide structure. The fingerprint recognition region includes a plurality of sub-fingerprint recognition regions, and the image sensor has a size smaller than or equal to a size of the fingerprint recognition region including the plurality of sub-fingerprint recognition regions.

In accordance with another aspect of the disclosure, a fingerprint recognition method of an electronic device is provided. The fingerprint recognition method includes a display panel, an image sensor, a first guide structure that changes a direction of incident light incident through a fingerprint recognition region of the display panel, and a second guide structure that changes a direction of incident light incident through the first guide structure includes obtaining image information of an external object, based on at least a portion of incident light incident on the image sensor through the first guide structure and the second guide structure by reflection of light emitted through the display panel by the external object and obtaining biometric information of the object, based on the image information. The fingerprint recognition region includes a plurality of sub-fingerprint recognition regions, and the image sensor has a size smaller than or equal to a size of the fingerprint recognition region including the plurality of sub-fingerprint recognition regions.

According to the various embodiments of the disclosure, it is possible to provide an electronic device and a fingerprint recognition method capable of improving the accuracy of fingerprint recognition.

According to the various embodiments of the disclosure, it is possible to improve the accuracy of fingerprint recognition while reducing the size of an image sensor for fingerprint recognition.

According to the various embodiments of the disclosure, it is possible to perform a wide range of imaging using an image sensor having a small size.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
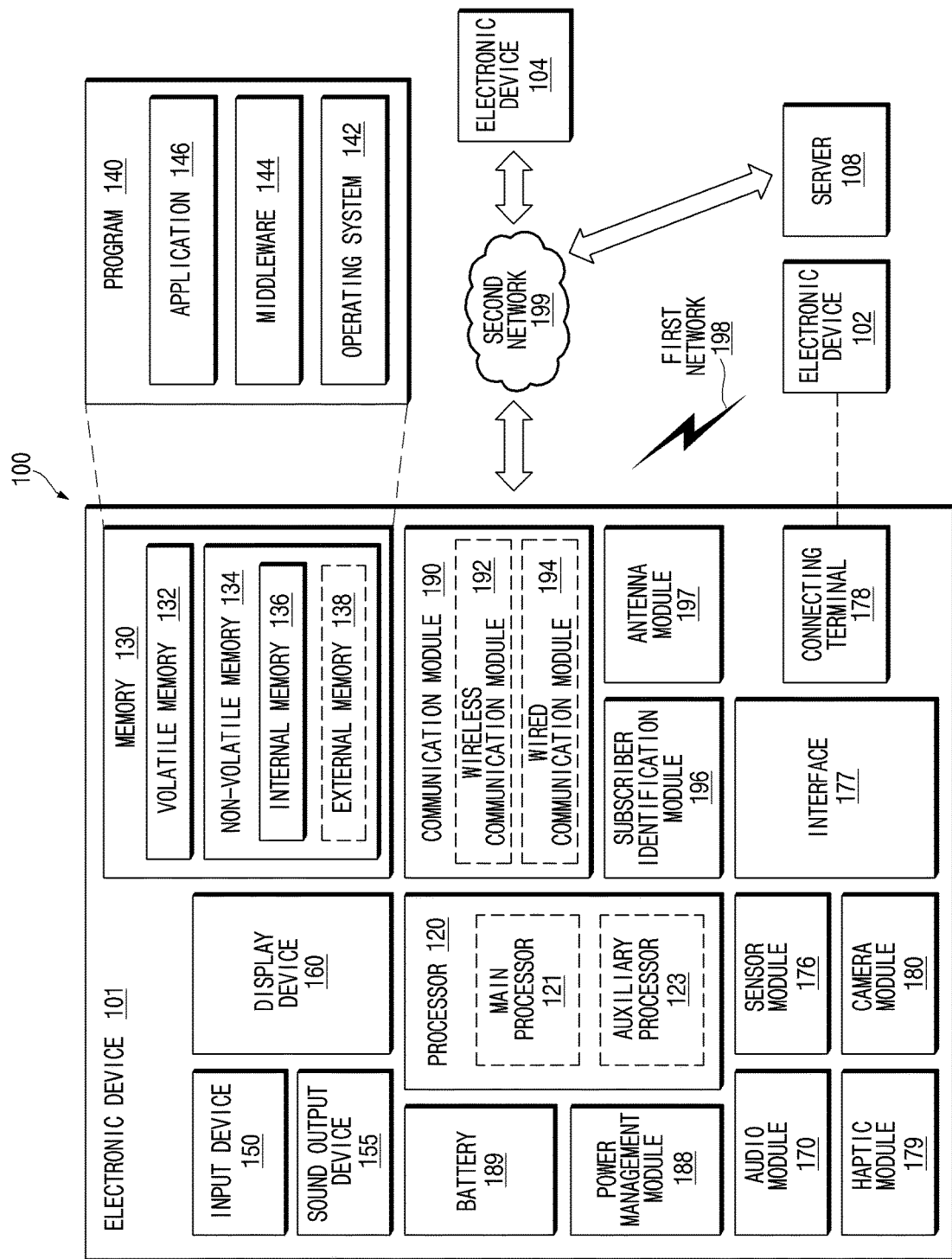
FIG. 1 illustrates an electronic device in a network environment according to an embodiment of the disclosure.

FIG. 1 is a block diagram of an electronic device 101 in a network environment 100 according to an embodiment of the disclosure.

Referring to FIG. 1, the electronic device 101 may communicate with an electronic device 102 through a first network 198 (e.g., a short-range wireless communication network) or may communicate with an electronic device 104 or a server 108 through a second network 199 (e.g., a long-distance wireless communication network) in the network environment 100. According to an embodiment, the electronic device 101 may communicate with the electronic device 104 through the server 108. According to an embodiment, the electronic device 101 may include a processor 120, a memory 130, an input device 150, a sound output device 155, a display device 160, an audio module 170, a sensor module 176, an interface 177, a haptic module 179, a camera module 180, a power management module 188, a battery 189, a communication module 190, a subscriber identification module 196, or an antenna module 197. According to some embodiments, at least one (e.g., the display device 160 or the camera module 180) among components of the electronic device 101 may be omitted or one or more other components may be added to the electronic device 101. According to some embodiments, some of the above components may be implemented with one integrated circuit. For example, the sensor module 176 (e.g., a fingerprint sensor, an iris sensor, or an illuminance sensor) may be embedded in the display device 160 (e.g., a display).

The processor 120 may execute, for example, software (e.g., a program 140) to control at least one of other components (e.g., a hardware or software component) of the electronic device 101 connected to the processor 120 and may process or compute a variety of data. According to an embodiment, as a part of data processing or operation, the processor 120 may load a command set or data, which is received from other components (e.g., the sensor module 176 or the communication module 190), into a volatile memory 132, may process the command or data loaded into the volatile memory 132, and may store result data into a nonvolatile memory 134. According to an embodiment, the processor 120 may include a main processor 121 (e.g., a central processing unit or an application processor) and an auxiliary processor 123 (e.g., a graphic processing device, an image signal processor, a sensor hub processor, or a communication processor), which operates independently from the main processor 121 or with the main processor 121. Additionally or alternatively, the auxiliary processor 123 may use less power than the main processor 121, or is specified to a designated function. The auxiliary processor 123 may be implemented separately from the main processor 121 or as a part thereof.

The auxiliary processor 123 may control, for example, at least some of functions or states associated with at least one component (e.g., the display device 160, the sensor module 176, or the communication module 190) among the components of the electronic device 101 instead of the main processor 121 while the main processor 121 is in an inactive (e.g., sleep) state or together with the main processor 121 while the main processor 121 is in an active (e.g., an application execution) state. According to an embodiment, the auxiliary processor 123 (e.g., the image signal processor or the communication processor) may be implemented as a part of another component (e.g., the camera module 180 or the communication module 190) that is functionally related to the auxiliary processor 123.

The memory 130 may store a variety of data used by at least one component (e.g., the processor 120 or the sensor module 176) of the electronic device 101. For example, data may include software (e.g., the program 140) and input data or output data with respect to commands associated with the software. The memory 130 may include the volatile memory 132 or the nonvolatile memory 134.

The program 140 may be stored in the memory 130 as software and may include, for example, an operating system 142, a middleware 144, or an application 146.

The input device 150 may receive a command or data, which is used for a component (e.g., the processor 120) of the electronic device 101, from an outside (e.g., a user) of the electronic device 101. The input device 150 may include, for example, a microphone, a mouse, a keyboard, or a digital pen (e.g., a stylus pen).

The sound output device 155 may output a sound signal to the outside of the electronic device 101. The sound output device 155 may include, for example, a speaker or a receiver. The speaker may be used for general purposes, such as multimedia play or recordings play, and the receiver may be used for receiving calls. According to an embodiment, the receiver and the speaker may be either integrally or separately implemented.

The display device 160 may visually provide information to the outside (e.g., the user) of the electronic device 101. For example, the display device 160 may include a display, a hologram device, or a projector and a control circuit for controlling a corresponding device. According to an embodiment, the display device 160 may include a touch circuitry configured to sense the touch or a sensor circuit (e.g., a pressure sensor) for measuring an intensity of pressure on the touch.

The audio module 170 may convert a sound and an electrical signal in dual directions. According to an embodiment, the audio module 170 may obtain the sound through the input device 150 or may output the sound through the sound output device 155 or an external electronic device (e.g., the electronic device 102) (e.g., a speaker or a headphone) directly or wirelessly connected to the electronic device 101.

The sensor module 176 may generate an electrical signal or a data value corresponding to an operating state (e.g., power or temperature) inside or an environmental state (e.g., a user state) outside the electronic device 101. According to an embodiment, the sensor module 176 may include, for example, a gesture sensor, a gyro sensor, a barometric pressure sensor, a magnetic sensor, an acceleration sensor, a grip sensor, a proximity sensor, a color sensor, an infrared sensor, a biometric sensor, a temperature sensor, a humidity sensor, or an illuminance sensor.

The interface 177 may support one or more designated protocols to allow the electronic device 101 to connect directly or wirelessly to the external electronic device (e.g., the electronic device 102). According to an embodiment, the interface 177 may include, for example, a high-definition multimedia interface (HDMI), a universal serial bus (USB) interface, a secure digital (SD) card interface, or an audio interface.

A connecting terminal 178 may include a connector that physically connects the electronic device 101 to the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal to a mechanical stimulation (e.g., vibration or movement) or an electrical stimulation perceived by the user through tactile or kinesthetic sensations. According to an embodiment, the haptic module 179 may include, for example, a motor, a piezoelectric element, or an electric stimulator.

The camera module 180 may shoot a still image or a video image. According to an embodiment, the camera module 180 may include, for example, at least one or more lenses, image sensors, image signal processors, or flashes.

The power management module 188 may manage power supplied to the electronic device 101. According to an embodiment, the power management module 188 may be implemented as at least a part of a power management integrated circuit (PMIC).

The battery 189 may supply power to at least one component of the electronic device 101. According to an embodiment, the battery 189 may include, for example, a non-rechargeable (primary) battery, a rechargeable (secondary) battery, or a fuel cell.

The communication module 190 may establish a direct (e.g., wired) or wireless communication channel between the electronic device 101 and the external electronic device (e.g., the electronic device 102, the electronic device 104, or the server 108) and support communication execution through the established communication channel. The communication module 190 may include at least one communication processor operating independently from the processor 120 (e.g., the application processor) and supporting the direct (e.g., wired) communication or the wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication module). The corresponding communication module among the above communication modules may communicate with the external electronic device 104 through the first network 198 (e.g., the short-range communication network such as a Bluetooth, a WiFi direct, or an infrared data association (IrDA)) or the second network 199 (e.g., the long-distance wireless communication network such as a cellular network, an internet, or a computer network (e.g., LAN or wide area network (WAN))). The above-mentioned various communication modules may be implemented into one component (e.g., a single chip) or into separate components (e.g., chips), respectively. The wireless communication module 192 may identify and authenticate the electronic device 101 using user information (e.g., international mobile subscriber identity (IMSI)) stored in the subscriber identification module 196 in the communication network, such as the first network 198 or the second network 199.

The antenna module 197 may transmit or receive a signal or power to or from the outside (e.g., the external electronic device). According to an embodiment, the antenna module 197 may include an antenna including a radiating element composed of a conductive material or a conductive pattern formed in or on a substrate (e.g., printed circuit board (PCB)). According to an embodiment, the antenna module 197 may include a plurality of antennas. In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some components among the components may be connected to each other through a communication method (e.g., a bus, a general purpose input and output (GPIO), a serial peripheral interface (SPI), or a mobile industry processor interface (MIPI)) used between peripheral devices to exchange signals (e.g., a command or data) with each other.

According to an embodiment, the command or data may be transmitted or received between the electronic device 101 and the external electronic device 104 through the server 108 connected to the second network 199. Each of the external electronic devices 102 and 104 may be the same or different types as or from the electronic device 101. According to an embodiment, all or some of the operations performed by the electronic device 101 may be performed by one or more external electronic devices among the external electronic devices 102 or 104 or the server 108. For example, when the electronic device 101 performs some functions or services automatically or by request from a user or another device, the electronic device 101 may request one or more external electronic devices to perform at least some of the functions related to the functions or services, in addition to or instead of performing the functions or services by itself. The one or more external electronic devices receiving the request may carry out at least a part of the requested function or service or the additional function or service associated with the request and transmit the execution result to the electronic device 101. The electronic device 101 may provide the result as is or after additional processing as at least a part of the response to the request. To this end, for example, a cloud computing, distributed computing, or client-server computing technology may be used.

Figure 2:
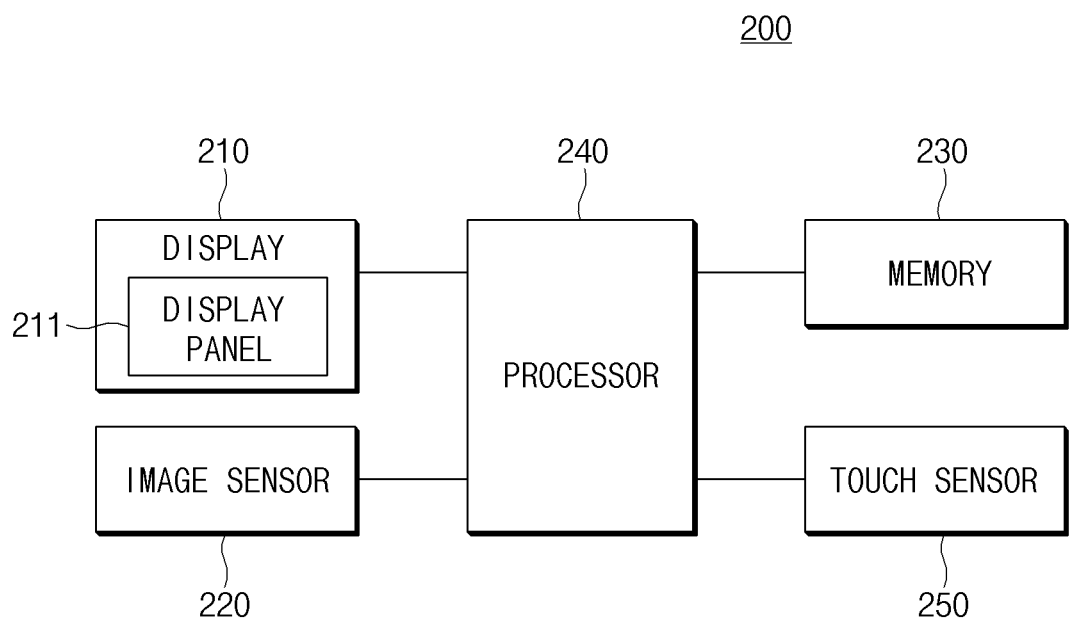
FIG. 2 is a block diagram of an electronic device according to an embodiment of the disclosure.

FIG. 2 is a block diagram of an electronic device 200 (e.g., the electronic device 101 of FIG. 1) according to an embodiment of the disclosure.

According to an embodiment, the electronic device 200 may include a display 210 (e.g., the display device 160 of FIG. 1), an image sensor 220, a memory 230 (e.g., the memory 130 of FIG. 1), a processor 240 (e.g., the processor 120 of FIG. 1), and a touch sensor 250.

According to an embodiment, the display 210 may include a display panel 211 including at least one light source. According to an embodiment, the display panel 211 may include a region specified for fingerprint recognition. According to an embodiment, the display panel 211 may include a fingerprint recognition region (e.g., a fingerprint recognition region 350 of FIG. 3A). For example, the fingerprint recognition region may include at least a partial region in the specified region. According to an embodiment, the fingerprint recognition region may include at least one sub-fingerprint recognition region. According to an embodiment, a plurality of sub-fingerprint recognition regions may be disposed to at least partially overlap each other when the electronic device 200 is viewed from one surface through which the display panel 211 is exposed to the outside (e.g., when viewed from one surface (the z-axis direction) through which a display of an electronic device is exposed to the outside in FIG. 3A (electronic device 300a)). According to an embodiment, the display 210 may include at least part of the display device 160 illustrated in FIG. 1.

According to an embodiment, the electronic device 200 may include a first guide structure (not illustrated) (e.g., a first guide structure 341 of FIG. 3A, a first guide structure 441 of FIG. 4, a first guide structure 541 of FIG. 5, a first guide structure 641 of FIG. 6, or a first guide structure 741 of FIG. 7) disposed between the display panel 211 and the image sensor 220 and configured to change the direction of light that is incident thereon after emitted through the fingerprint recognition region of the display panel 211 and reflected from an external object and a second guide structure (not illustrated) (e.g., a second guide structure 343 of FIG. 3A, a second guide structure 443 of FIG. 4, a second guide structure 543 of FIG. 5, a second guide structure 643 of FIG. 6, or a second guide structure 743 of FIG. 7) disposed between the first guide structure and the image sensor 220 and configured to change the direction of the light that is incident thereon after passing through the first guide structure. For example, the first guide structure and the second guide structure may include at least one lens. According to an embodiment, the at least one lens included in the first guide structure and the at least one lens included in the second guide structure may have different forms or arrangements. According to an embodiment, each of the first guide structure and the second guide structure may include at least one lens corresponding to the at least one sub-fingerprint recognition regions. According to an embodiment, the first guide structure may include a plurality of lenses corresponding to the plurality of sub-fingerprint recognition regions, and the second guide structure may include one lens.

According to an embodiment, the image sensor 220 may obtain image information of the external object, based on at least a portion of incident light incident on the image sensor by reflection of light emitted through the display panel 211 by the external object. For example, the image information may include a fingerprint image of the external object. According to an embodiment, the image sensor 220 may have an area smaller than or equal to the area of the fingerprint recognition region. According to an embodiment, the image sensor 220 may have a size corresponding to a sub-fingerprint recognition region disposed at the center among the plurality of sub-fingerprint recognition regions.

According to an embodiment, the memory 230 may store instructions that, when executed, cause the processor 240 to perform operations. According to an embodiment, the memory 230 may store image information and/or a fingerprint image obtained through the image sensor 220. According to an embodiment, the memory 230 may store a user's registered biometric information (e.g., fingerprint image). According to an embodiment, the memory 230 may include at least part of the memory 130 illustrated in FIG. 1.

According to an embodiment, the processor 240 may obtain image information of the external object through the image sensor 220. According to an embodiment, the processor 240 may obtain biometric information (e.g., fingerprint information) of the external object, based on the image information. According to an embodiment, the processor 240 may perform a specified function (e.g., execution of user authentication, a specified operation, a function, and/or an application), based on whether the biometric information of the object corresponds to the user's stored biometric information.

According to an embodiment, the processor 240 may be configured to emit light sequentially or according to a specified pattern or a specified order from light sources corresponding to the plurality of sub-fingerprint recognition regions through the display panel 211.

According to an embodiment, the processor 240 may emit light from a light source corresponding to a sub-fingerprint recognition region disposed at the center among the plurality of sub-fingerprint recognition regions through the display panel 211 and may obtain image information, based on incident light incident on the image sensor 220 by reflection of the emitted light by the external object. According to an embodiment, when the obtained image information corresponding to the sub-fingerprint recognition region does not satisfy a criterion set to obtain biometric information of the object, the processor 240 may emit light from a light source corresponding to another sub-fingerprint recognition region and may obtain another piece of image information, based on incident light incident on the image sensor 220 by reflection of the light emitted from the light source corresponding to the other sub-fingerprint recognition region by the external object. According to an embodiment, the processor 240 may obtain biometric information of the object, based on the image information and the other image information.

According to an embodiment, the touch sensor 250 may be part of a sensor module (e.g., the sensor module 176 of FIG. 1) or the display 210 (e.g., the display device 160 of FIG. 1). For example, the touch sensor 250 may include touch circuitry configured to detect a touch or a sensor circuit (e.g., a pressure sensor) configured to measure the magnitude of a force generated by the touch. According to an embodiment, the touch sensor 250 may be disposed between the display 210 (e.g., the display panel 211) and the image sensor 220. According to an embodiment, the processor 240 may be configured to emit light from a light source corresponding to the fingerprint recognition region through the display panel 211, when the touch sensor 250 detects that the external object makes contact with the fingerprint recognition region.

According to an embodiment, the processor 240 may include at least part of the processor 120 illustrated in FIG. 1.

Figure 3A:
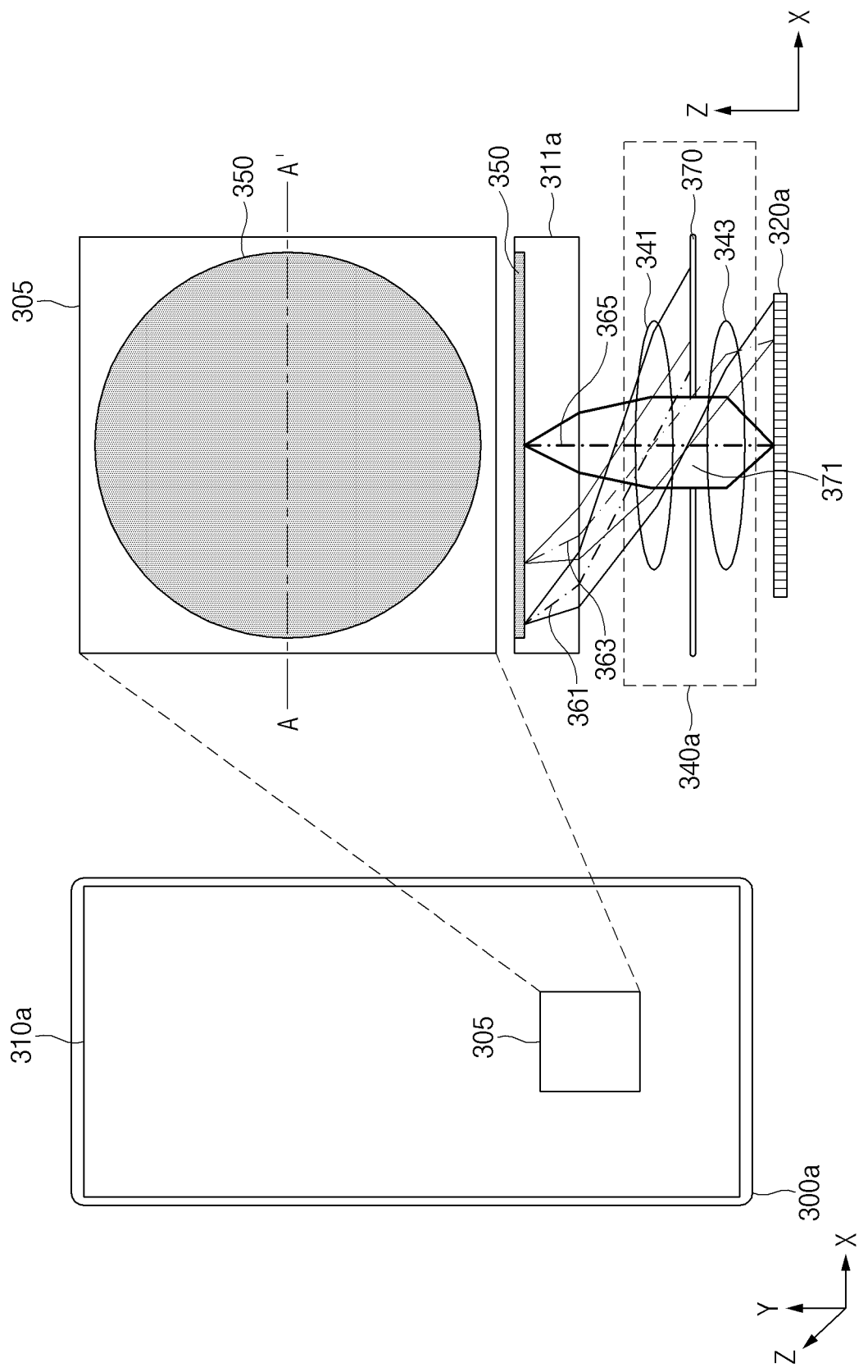
FIG. 3A is a view for describing a fingerprint recognition structure and a fingerprint recognition operation of an electronic device according to an embodiment of the disclosure.

FIG. 3A is a view for describing a fingerprint recognition structure and a fingerprint recognition operation of an electronic device 300a (e.g., the electronic device 101 of FIG. 1 or the electronic device 200 of FIG. 2) according to an embodiment of the disclosure.

Referring to FIG. 3A, a plan view of the electronic device 300a is illustrated on the left side of FIG. 3A, an enlarged view of a specified region 305 of a display 310a (e.g., a display panel 311a) is illustrated on the upper right side of FIG. 3A, and a sectional view of the specified region 305 taken along line A-A' is illustrated on the lower right side of FIG. 3A.

According to an embodiment, the electronic device 300a (e.g., the fingerprint recognition structure of the electronic device) may include the display panel 311a including at least one light source, an image sensor 320a disposed to obtain image information (e.g., a fingerprint image) for an object external to the electronic device 300a through the at least one light source, and an optical path change member 340a disposed between the display panel 311a and the image sensor 320a. According to an embodiment, the optical path change member 340a may include a first guide structure 341 disposed between the display panel 311a and the image sensor 320a and configured to change the direction of light that is incident thereon after emitted through a fingerprint recognition region 350 of the display panel 311a and reflected from the external object and a second guide structure 343 disposed between the first guide structure 341 and the image sensor 320a and configured to change the direction of the light that is incident thereon after passing through the first guide structure 341. According to an embodiment, the display panel of the electronic device may include the specified region 305 including the fingerprint recognition region 350. For example, the specified region 305 may be configured to inform a user of the fingerprint recognition region 350. For example, the electronic device may provide information about the fingerprint recognition region 350 to the user through visual display of at least a portion of the specified region 305.

According to an embodiment, the electronic device 300a may emit light from the light source corresponding to the fingerprint recognition region 350 and may recognize a fingerprint of the external object, based on the light incident thereon after reflected from the external object (e.g., a finger (fingerprint)). According to an embodiment, the first guide structure 341 (e.g., a first lens) and the second guide structure 343 (e.g., a second lens) may focus the incident light, or may change the direction of the incident light, such that the light reflected from the external object is incident on the image sensor 320a.

According to an embodiment, a blocking layer 370 for blocking light may be disposed between the first guide structure 341 and the second guide structure 343. According to an embodiment, the blocking layer 370 may be an independent component for blocking light, and an outer wall of a support structure (e.g., a lens barrel (not illustrated)) of the lens included in the first guide structure 341 or the second guide structure 343 may serve as the blocking layer. For example, the blocking layer 370 may intentionally select a component of light reaching the image sensor 320a. According to an embodiment, the blocking layer 370 may serve as an aperture corresponding to the first guide structure 341 and the second guide structure 343. For example, the blocking layer 370 may be configured such that the amount of light incident on the image sensor 320a through the first guide structure 341 and the second guide structure 343 reaches a specified amount.

For example, as the size of the fingerprint recognition region 350 (e.g., a field of view (FOV)) is increased, the electronic device 300a may obtain a fingerprint image having a wider range (size). For example, in the case of the image sensor 320a (a fingerprint sensor) in an optical display, not only the quality of an obtained fingerprint image but also the fact that fingerprint images obtained from the same object have the same quality as a previously registered reference image may have a significant effect on the accuracy of fingerprint recognition. In terms of the consistency of an obtained fingerprint image, an imaging system that obtains an image having good quality only under a specific condition may bring about a large difference in image quality depending on a change in an external environment. For example, in the design of a lens of the imaging system, the square of a numerical aperture (NA) may be inversely proportional to a thickness (e.g., a depth of field (DOF)) for effectively obtaining a fingerprint. For example, the DOF may be proportional to wavelength/$NA^2$. For example, in the case of the optical image sensor 320a, a lens having a numerical aperture (NA) as large as possible is designed to minimize the influence of a low light transmittance (e.g., 5% or less) of the display panel 311a (e.g., an organic light emitting diode (OLED) panel), and for a wider measurement region, design is made such that a field of view (FOV) is as large as possible. As a result, the thickness (e.g., a depth of field (DOF)) for effectively obtaining a fingerprint may be decreased, and therefore a slight change in the position of a fingerprint in the height direction may result in different images of the same sample. For example, the DOF of the electronic device 300a using a lens of NA 0.3 may be about 4 μm, and accordingly when the user attaches a protective film or protective glass to protect the display panel 311a, the accuracy of matching a fingerprint image may be decreased. For example, even when fingerprint images are obtained from the same object (fingerprint), there may be a difference in the overall noise level depending on a change in the distance between the image sensor 320a and the object, and the degrees of magnifications of the fingerprint images may differ from each other.

According to an embodiment, when an obtained fingerprint image has an error only in magnification without distortion, the electronic device 300a may perform fingerprint recognition by correcting the obtained fingerprint image in a process of matching the obtained fingerprint image and stored biometric information of the user (e.g., a registered fingerprint image of the user).

For example, dotted lines illustrated in FIG. 3A represent components of chief rays 361, 363, and 365 at respective positions in the fingerprint recognition region 350 (e.g., FOV). According to an embodiment, to widen a region of an obtained fingerprint image, the fingerprint recognition region 350 may be set to be larger than the chief ray angle of the first guide structure 341 or the second guide structure 343. Referring to FIG. 3A, depending on a position in the fingerprint recognition region 350, a light component reflected from an external object (e.g., a fingerprint) may pass through an opening 371 of the blocking layer 370 and may be delivered to the image sensor 320a. According to an embodiment, the blocking layer 370 may be disposed between the first guide structure 341 and the second guide structure 343, and the opening 371 formed in a portion of the blocking layer 370 may serve as an aperture. For example, the display panel 311a (e.g., an OLED) may generally emit light with a cosine-type intensity distribution with respect to a light emission angle, and components scattered at different angles may have information of other frequency components in an object. Thus, the image sensor 320a may obtain different images (or, images having different qualities) depending on positions in the fingerprint recognition region 350 even for the same object. Accordingly, to obtain a fingerprint image in the wide fingerprint recognition region 350, the image sensor 320a having a size or structure corresponding thereto may be required. For example, when light emitted from the display panel 311a is polarized and emitted in a specific direction, the polarization angle of incident light may be changed depending on the guide structures (e.g., the first guide structure 341 and the second guide structure 343) included in the electronic device 300a, and the qualities of obtained fingerprint images may differ from each other depending on positions in the fingerprint recognition region 350. For example, the quality (e.g., contrast) of a portion of the periphery (e.g., an upper left end and a lower right end, or an upper right end and a lower left end) of a fingerprint image corresponding to the fingerprint recognition region 350 may be deteriorated depending on a direction in which incident light is polarized. For example, when the quality of a portion of a fingerprint image is deteriorated, a portion of the fingerprint image substantially used for fingerprint recognition may be decreased, and fingerprint recognition performance may be deteriorated.

To obtain a high-quality fingerprint image, the electronic device 300a according to various embodiments of the disclosure may have a structure of the first guide structure 341, the second guide structure 343, and the image sensor 320a corresponding to the size and setting of the fingerprint recognition region 350. Hereinafter, the structure of the electronic device 300a according to various embodiments of the disclosure will be described in more detail.

Figure 3B:
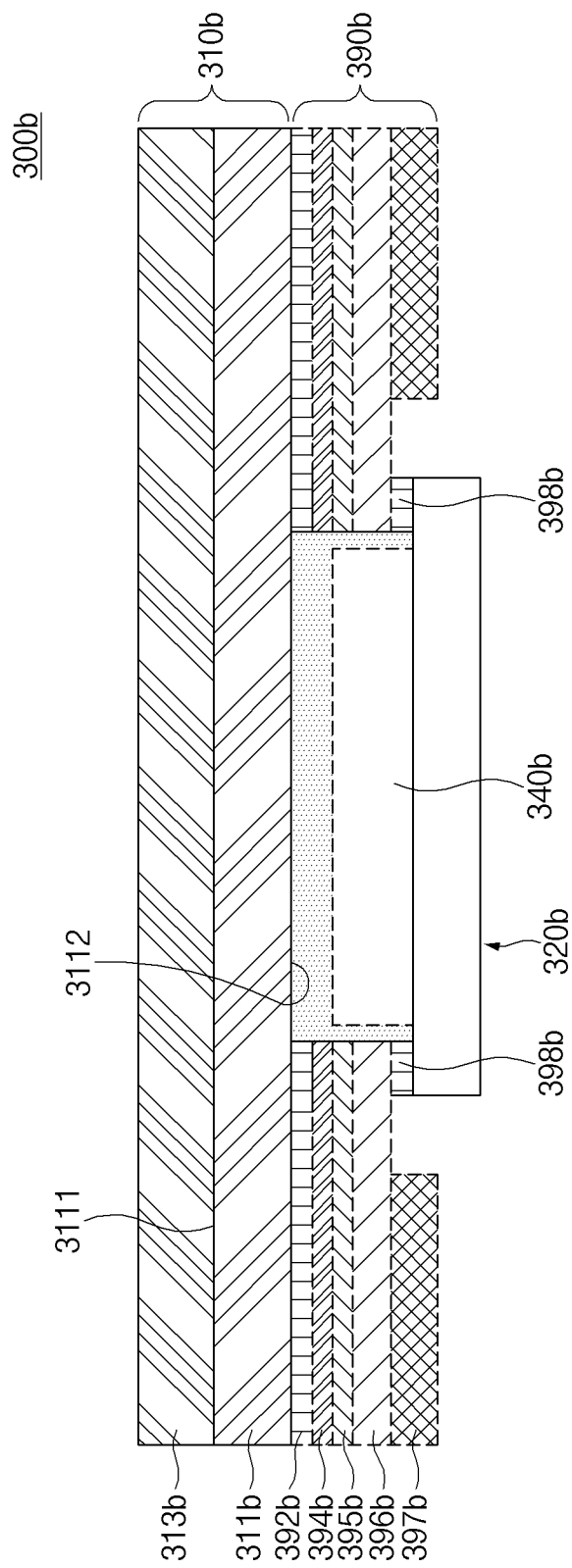
FIG. 3B illustrates a sectional view of an electronic device according to an embodiment of the disclosure.

FIG. 3B is a sectional view of an electronic device according to an embodiment of the disclosure.

Referring to FIG. 3B, the electronic device 300b according to various embodiments may include a display panel part 310b, a back panel 390b, an image sensor 320b (e.g., the image sensor 320a of FIG. 3A), and an optical path change member 340b (e.g., the optical path change member 340a of FIG. 3A (e.g., the first guide structure 341, the second guide structure 343, and/or the blocking layer 370 of FIG. 3A)). In an embodiment, some of the components may be omitted, or additional components may be further included. In an embodiment, some of the components may be combined together to form one object, but the object may identically perform functions of the corresponding components before the combination.

According to an embodiment, the back panel 390b may be formed under the display panel part 310b of the electronic device 300b, or may not be formed under the display panel part 310b.

The display panel part 310b according to various embodiments may include a transparent member 313b and a display panel 311b (e.g., the display panel 311a of FIG. 3A). The transparent member 313b may be an exterior member disposed on the display panel 311b of the electronic device and may be referred to as, for example, a window, a front window, a glass cover, or a transparent substrate. For example, the transparent member 313b may be formed of tempered glass or a transparent synthetic resin having the same hardness as glass.

The display panel 311b according to various embodiments may be configured in a structure combined with touch detection circuitry, a pressure sensor capable of measuring the intensity (pressure) of a touch, and/or a digitizer for detecting a stylus pen of a magnetic field type. For example, the display panel 311b may be planar or curved, or may be configured by a combination of a planar surface and a curved surface. The display panel 311b may be formed of a rigid material or a flexible material. According to an embodiment, the display panel may include at least one light source (e.g., self-emissive OLED-based pixels). For example, a pixel disposed in the display panel 311b may emit specified light under the control of a processor or a display driver integrated circuit (DDIC). For example, light emitted from a light source (e.g., a pixel) may be reflected by an object (e.g., a finger) disposed in front of the display panel 311b, may transmit through at least one transmissive region of the display panel 311b and the optical path change member 340b, and may be delivered to a light receiving part of the image sensor 320b.

The display panel 311b according to various embodiments may include a first surface 3111 facing a first direction and a second surface 3112 facing a second direction opposite to the first direction. The transparent member 313b may be disposed on the first surface 3111 of the display panel, and an adhesive layer may be located on the second surface 3112 of the display panel.

According to an embodiment, the back panel 390b may be disposed on the rear surface of the display panel 311b and may protect the display panel 311b from an impact, may support the display panel 311b on a housing (e.g., a bracket), or may shield electromagnetic waves generated from the display panel 311b or radiate heat generated from the display panel 311b.

The back panel 390b according to an embodiment may be a panel attached to the bottom of the display panel 311b by an adhesive layer 392b and may include a black coating layer 394b and an impact absorbing member 395b. For example, the back panel 390b may additionally include, or may not include, a digitizer 396b. Furthermore, the digitizer 396b may be disposed, or may not be disposed, under the impact absorbing member 395b.

The impact absorbing member 395b according to various embodiments may be disposed under the black coating layer 394b and may absorb an impact applied to the electronic device such that the impact is not transmitted to the display panel 311b. For example, the impact absorbing member 395b may be disposed in a layer shape between the black coating layer 394b and the digitizer 396b and may include a cushion formed of a foamed resin. The back panel 390b may not be configured in the electronic device 300b, or may be replaced with a pressure sensor or a touch sensitive panel instead of the digitizer 396b.

The electronic device 300b according to various embodiments may have an opening formed in at least a partial region under the display panel 311b. For example, the opening may be formed as a part mounting space by cutting a portion of the back panel 390b disposed under the display panel 311b. For example, the cut-away portion of the back panel 390b may be at least one of a portion of the adhesive layer 392b, a portion of the black coating layer 394b, a portion of the impact absorbing member 395b, or a portion of the digitizer 396b, and the portions may be cut and removed. For example, the image sensor 320b may be disposed in the opening. According to various embodiments, the opening may be filled with air, or may be filled with a separate filling material. For example, the opening may have a substantially rectangular parallelepiped shape, but is not limited thereto.

The image sensor 320b according to various embodiments may be mounted in the opening. The image sensor 320b may be used as a fingerprint sensor. The image sensor 320b may be disposed to face the display panel 311b and may be disposed to be parallel to (to face) the second surface 3112 of the display panel. For example, the image sensor 320b may be disposed to be completely accommodated in the opening, or at least a portion thereof may be disposed in the opening. According to an embodiment, the image sensor 320b may be attached to at least a portion of the back panel 390b, may be attached to at least a portion of the display panel 310b, or may be attached to a support member (e.g., a bracket (not illustrate)). For example, the image sensor 320b may be attached to at least a portion of the back panel 390b by using an adhesive member 398b. Referring to FIG. 3B, the image sensor 320b is illustrated as being attached to the digitizer 396b through the adhesive member 398b. However, according to various embodiments, a portion of the back panel 390b to which the image sensor 320b is attached is not limited thereto and may be diversely changed.

According to an embodiment, the image sensor 320b may obtain transmitted light that is output through the light source (e.g., at least some of a plurality of pixels) of the display panel 311b, is reflected by an external object (e.g., a finger (fingerprint)) close to the transparent member 313b, transmits through the transmissive region of the display panel 311b, and passes through the optical path change member 340b. For example, the image sensor 320b may obtain light that is output through at least some pixels of the display panel 311b, is reflected by the external object close to the transparent member 313b, transmits through the transmissive region of the display panel 311b, passes through the optical path change member 340b, and is incident on the light receiving part of the image sensor 320b. The image sensor 320b may configure image information required for fingerprint recognition by using the obtained light and may store the configured image information in an internal memory (not illustrated) of the image sensor 320b or a memory of the electronic device 300b (e.g., the memory 130 of FIG. 1 or the memory 230 of FIG. 2) such that the processor (e.g., an AP, a DDI, or a low-power processor) (e.g., the processor 120 of FIG. 1 or the processor 240 of FIG. 2) of the electronic device 300b (e.g., the electronic device 101 of FIG. 1 or the electronic device 200 of FIG. 2) accesses the image information.

According to an embodiment, the optical path change member 340b (e.g., the optical path change member 340a of FIG. 3A) may be disposed in the opening between the display panel 311b and the image sensor 320b. For example, the optical path change member 340b may be disposed between the image sensor 320b and the display panel 311b such that the optical path change member 340b is spaced apart from the display panel 311b by a first distance and is spaced apart from the image sensor 320b by a second distance (<the first distance). For example, the first distance may be set such that interference due to diffraction of the transmitted light is less than or equal to a specified magnitude. For example, the specified magnitude may be experimentally determined based on the influence of the interference due to the diffraction on a fingerprint recognition signal of the image sensor 320b. In another example, the optical path change member 340b may be disposed in a hole formed in a back cover (not illustrated) of the electronic device 300b. According to the above-described embodiment, the optical path change member 340b may be disposed close to the display panel 311b. Accordingly, the optical path change member 340b may prevent a problem that the image sensor 320b does not obtain a good signal required for fingerprint recognition due to diffraction of light caused by the transmissive region of the display panel 311b.

According to an embodiment, the optical path change member 340b may be disposed on the image sensor 320b and may be disposed to face the display panel 311b. According to an embodiment, the optical path change member 340b may be disposed between the image sensor 320b and the display panel 311b and may change an optical path for at least a portion of light passing through the display panel 311b. According to an embodiment, the optical path change member 340b may include a first guide structure (e.g., the first guide structure 341 of FIG. 3A) disposed between the display panel 311b and the image sensor 320b and configured to change the direction of light that is incident thereon after emitted through a fingerprint recognition region of the display panel 311b (e.g., the fingerprint recognition region 350 of FIG. 3A) and reflected from the external object and a second guide structure (e.g., the second guide structure 343 of FIG. 3A) disposed between the first guide structure and the image sensor 320b and configured to change the direction of the light that is incident thereon after passing through the first guide structure. According to an embodiment, a blocking layer (e.g., the blocking layer 370 of FIG. 3A) for blocking light may be disposed between the first guide structure and the second guide structure.

According to an embodiment, the optical path change member 340b may be formed to change the path of at least a portion of transmitted light passing through the transmissive region (e.g., 310a of FIG. 3A). For example, the optical path change member 340b may include an optical layer (e.g., a lens, a pin-hole array, or a multi-layer collimator) and may focus light incident on the optical layer. For example, the optical path change member 340b may further include at least one of a light blocking layer (e.g., the blocking layer 370 of FIG. 3A), a filter layer, or a buffer layer. For example, the light blocking layer may block incidence or reflection of light to a path other than a path formed in the optical layer. For example, the light blocking layer may include a black coating layer (e.g., a black sheet or a black printed layer) attached or applied to a region other than a light incident region over the optical layer. The filter layer may block input of light (e.g., light in red and near-infrared bands) other than light in a specified wavelength band. The buffer layer may be attached to an upper surface (e.g., a surface facing the display) of the optical layer and may adjust the distance between the display panel 311b and the image sensor 320b. According to an embodiment, the optical path change member 340b may be formed of a material or structure that less affects the display panel 311b. For example, the periphery of a surface of the optical path change member 340b in contact with the display panel 311b may be subjected to a rounding process. According to the above-described embodiment, the optical path change member 340b may prevent damage to the display panel 311b due to a frictional force between the optical path change member 340b and the display panel 311b or an external impact.

According to an embodiment, a shielding sheet 397b may be a copper sheet or a copper plate that is formed of copper. For example, the shielding sheet 397b may be a support structure that supports the digitizer 396b and may have a function of radiating heat of the display panel 311b. The shielding sheet 397b may not be configured in the back panel 390b.

According to various embodiments, sections of the electronic devices 300a and 300b are not limited to that illustrated in FIG. 3B and may be at least partially modified. For example, the electronic devices 300a and 300b may have various structures in which structures (e.g., the optical path change members 340a and 340b) for fingerprint recognition are disposed between the display panels 311a and 311b and the image sensors 320a and 320b. For example, the optical path change members 340a and 340b may include the first guide structure 341, the second guide structure 343, and the blocking layer 370 illustrated in FIG. 3A and may include at least a part of fingerprint recognition structures of electronic devices according to various embodiments of the disclosure that will be described with reference to FIGS. 4 to 7.

Figure 4:
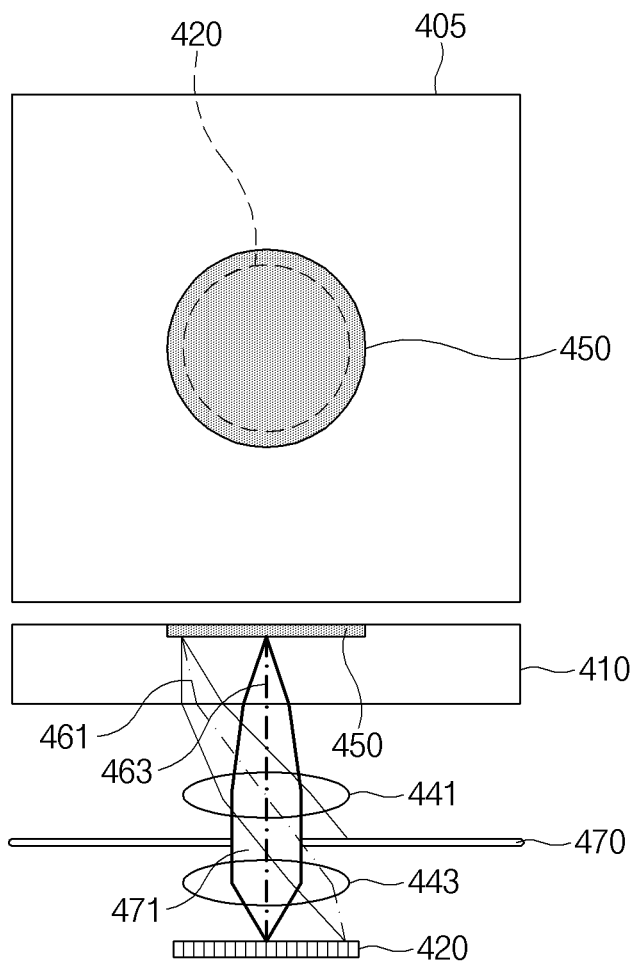
FIG. 4 is a view for describing a fingerprint recognition structure and a fingerprint recognition operation of an electronic device according to an embodiment of the disclosure.

FIG. 4 is a view for describing a fingerprint recognition structure and a fingerprint recognition operation of an electronic device 400 (e.g., the electronic device 101 of FIG. 1 or the electronic device 200 of FIG. 2) according to an embodiment of the disclosure.

According to an embodiment, the electronic device 400 may include a display panel 410 (e.g., the display panel 211 of FIG. 2 or the display panel 311a of FIG. 3A) that includes at least one light source, an image sensor 420 (e.g., the image sensor 220 of FIG. 2 or the image sensor 320a of FIG. 3A) disposed to obtain image information of an object external to the electronic device 400 through the at least one light source, a first guide structure 441 (e.g., the first guide structure 341 of FIG. 3A) disposed between the display panel 410 and the image sensor 420 and configured to change the direction of light that is incident thereon after emitted through a fingerprint recognition region 450 of the display panel 410 and reflected from the external object, and a second guide structure 443 (e.g., the second guide structure 343 of FIG. 3A) disposed between the first guide structure 441 and the image sensor 420 and configured to change the direction of the light that is incident thereon after passing through the first guide structure 441.

Referring to FIG. 4, compared to that illustrated in FIG. 3A, the electronic device 400 may have the fingerprint recognition region 450 (e.g., FOV) smaller than the fingerprint recognition region 350 of FIG. 3A. For example, a specified region 405 of the display panel 410 may have a size that corresponds to, or is smaller than, the size of the specified region 305 of FIG. 3A. For example, in FIG. 4, the electronic device 400 may have a form in which the ratio of the fingerprint recognition region 450 to the specified region 405 having the same size is reduced. According to an embodiment, as the size of the fingerprint recognition region 450 is decreased, the image sensor 420 included in the electronic device 400 may also be decreased to a size corresponding to the fingerprint recognition region 450. According to an embodiment, the image sensor 420 may have a smaller area than the fingerprint recognition region 450. For example, referring to the plan view on the upper side of FIG. 4, when it is assumed that the fingerprint recognition region 450 and the image sensor 420 have a circular shape, the area of the image sensor 420 may be smaller than or equal to the area of the fingerprint recognition region 450. For example, in the case of FIG. 3A, due to the wider fingerprint recognition region 350, a fingerprint image having a wider range may be obtained. However, an edge portion with poor quality in the obtained fingerprint image may not substantially have a great influence on fingerprint recognition performance. For example, although the size of the fingerprint recognition region 450 is decreased, incident light that is reflected by the external object (e.g., a fingerprint of a finger) within the entire fingerprint recognition region 450 and is incident on the image sensor 420 through the first guide structure 441 and the second guide structure 443 may include more light components having information about the object. For example, the chief ray component at the center of the fingerprint recognition region 350 of FIG. 3A may be incident on the image sensor 320a through the opening 371 of the blocking layer 370, whereas the chief ray component 361 at the edge may not be incident on the image sensor 320a due to the blocking layer 370. In contrast, in the case of FIG. 4, both a chief ray component at the center of the fingerprint recognition region 450 and a chief ray component 461 at the edge of the fingerprint recognition region 450 may be incident on the image sensor 420 without being blocked by a blocking layer 470.

According to an embodiment, the electronic device 400 may include the blocking layer 470 between the first guide structure 441 and the second guide structure 443. According to an embodiment, an opening formed in a portion of the blocking layer 470 may be configured to serve as an aperture 471. For example, the area of the opening (e.g., the aperture 471) of the blocking layer 470 may be set in consideration of the characteristics of the first guide structure 441, the second guide structure 443, and the image sensor 420 and the chief ray components 461 and 463 of light that is incident on the image sensor 420 after reflected by the external object. For example, the area of the opening (e.g., the aperture 471) of the blocking layer 470 may be set such that the chief ray component 461 of light reflected by the outermost portion of the fingerprint recognition region 450 passes through the opening 471 of the blocking layer 470 and is incident on the image sensor 420.

According to an embodiment, when the numerical aperture (NA) of an imaging system (e.g., the first guide structure 441 and/or the second guide structure 443) is decreased, a change in a fingerprint image depending on a change of the object (e.g., a fingerprint) in the height direction may be decreased (that is, a depth of field (DOF) may be increased). For example, when the NA of the imaging system (e.g., the first guide structure 441 and/or the second guide structure 443) is about 0.3, a diffraction limited resolution may be about 1 μm. However, an obtained image may be limited by a pixel size, and accordingly the resolution of the image sensor 420 (the imaging system) may be about 100 μm. For example, referring to FIG. 4, when the NA of the imaging system (e.g., the first guide structure 441 and/or the second guide structure 443) of the electronic device 400 is reduced to about 0.05 by making the size of the opening 471 of the blocking layer 470 of the electronic device 400 smaller than the size of the opening 371 of the blocking layer 370, the DOF may be increased by about 30 times or more without a change in the resolution of the image sensor 420, and a change in a fingerprint image depending on a change of the external object in the height direction may be minimized. In contrast, as the NA of the imaging system (e.g., the first guide structure 441 and/or the second guide structure 443) is decreased, the brightness of an obtained fingerprint image may become dark, or the time taken to obtain the fingerprint image may be increased. According to various embodiments, the NA of the imaging system (e.g., the first guide structure 441 and/or the second guide structure 443) may be set in consideration of the sensitivity and the imaging exposure time of the image sensor 420 and a required DOF.

According to an embodiment, by decreasing the fingerprint recognition region 450 of the display panel 410 and making the first guide structure 441, the second guide structure 443, and the image sensor 420 compact, the electronic device 400 may reduce misrecognition of a fingerprint image due to a change in DOF while increasing spatial efficiency.

Figure 5:
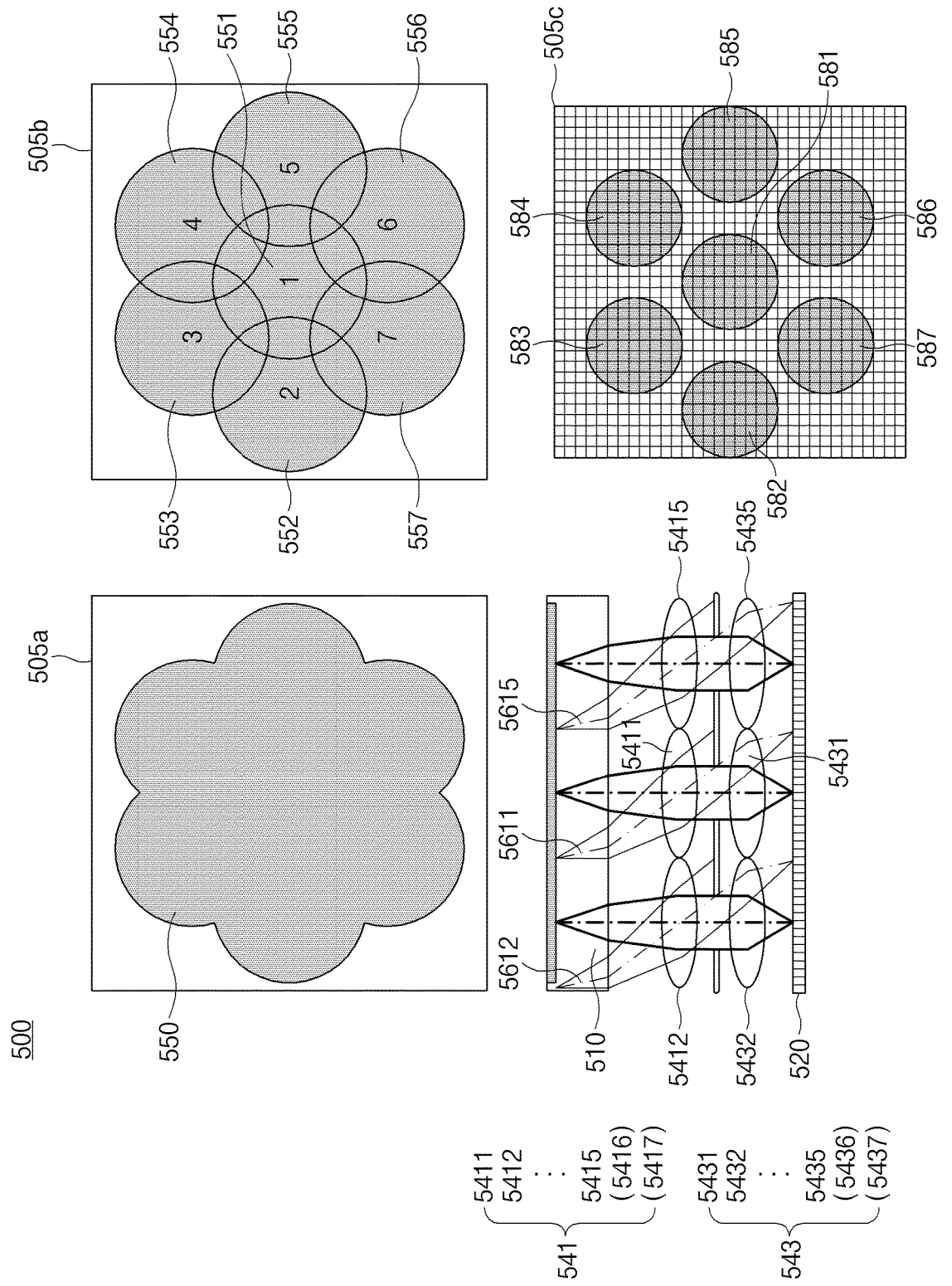
FIG. 5 is a view for describing a fingerprint recognition structure and a fingerprint recognition operation of an electronic device according to an embodiment of the disclosure.

FIG. 5 is a view for describing a fingerprint recognition structure and a fingerprint recognition operation of an electronic device 500 (e.g., the electronic device 101 of FIG. 1 or the electronic device 200 of FIG. 2) according to an embodiment of the disclosure.

According to an embodiment, the electronic device 500 may include a display panel 510 (e.g., the display panel 211 of FIG. 2 or the display panel 311a of FIG. 3A) that includes at least one light source, an image sensor 520 (e.g., the image sensor 220 of FIG. 2 or the image sensor 320a of FIG. 3A) disposed to obtain image information of an object external to the electronic device through the at least one light source, a first guide structure 541 (e.g., the first guide structure 341 of FIG. 3A) disposed between the display panel 510 and the image sensor 520 and configured to change the direction of light that is incident thereon after emitted through a fingerprint recognition region 550 of the display panel 510 and reflected from the external object, and a second guide structure 543 (e.g., the second guide structure 343 of FIG. 3A) disposed between the first guide structure 541 and the image sensor 520 and configured to change the direction of the light that is incident thereon after passing through the first guide structure 541.

Referring to 505a and 505b, the fingerprint recognition region 550 of the display panel 510 may include a plurality of sub-fingerprint recognition regions 551, 552, 553, 554, 555, 556, and 557. According to an embodiment, the plurality of sub-fingerprint recognition regions 551, 552, 553, 554, 555, 556, and 557 may be unit areas specified to emit light for fingerprint recognition in the display panel and may be specified unit regions that obtain a corresponding fingerprint image based on incident light reflected from the external object (e.g., a fingerprint) after emitted through the display panel. According to an embodiment, the sub-fingerprint recognition regions 551, 552, 553, 554, 555, 556, and 557 may at least partially overlap each other when the electronic device 500 is viewed from one surface through which the display panel 510 is exposed (e.g., when the electronic device 300 is viewed in the z-axis direction as illustrated in FIG. 3A (electronic device 300a)). For example, as illustrated in FIG. 5, the electronic device 500 may set the wide fingerprint recognition region 550 similarly to that illustrated in FIG. 3A, by setting the fingerprint recognition region 550 including the plurality of sub-fingerprint recognition regions 551, 552, 553, 554, 555, 556, and 557.

According to an embodiment, the electronic device 500 may include the image sensor 520 having a size corresponding to the entire fingerprint recognition region 550. According to an embodiment, the electronic device 500 may include the first guide structure 541 and the second guide structure 543 that correspond to the sub-fingerprint recognition regions 551, 552, 553, 554, 555, 556, and 557. For example, the first guide structure 541 and the second guide structure 543 may include a plurality of lenses that correspond to the sub-fingerprint recognition regions 551, 552, 553, 554, 555, 556, and 557. For example, the first guide structure 541 may include a first lens 5411 corresponding to the first sub-fingerprint recognition region 551, a second lens 5412 corresponding to the second sub-fingerprint recognition region 552, a third lens 5413 (not illustrated) corresponding to the third sub-fingerprint recognition region 553, a fourth lens 5414 (not illustrated) corresponding to the fourth sub-fingerprint recognition region 554, a fifth lens 5415 corresponding to the fifth sub-fingerprint recognition region 555, a sixth lens 5416 (not illustrated) corresponding to the sixth sub-fingerprint recognition region 556, and a seventh lens 5417 (not illustrated) corresponding to the seventh sub-fingerprint recognition region 557. For example, the second guide structure 543 may include an eighth lens 5431 corresponding to the first sub-fingerprint recognition region 551, a ninth lens 5432 corresponding to the second sub-fingerprint recognition region 552, a tenth lens 5433 (not illustrated) corresponding to the third sub-fingerprint recognition region 553, an eleventh lens 5434 (not illustrated) corresponding to the fourth sub-fingerprint recognition region 554, a twelfth lens 5435 corresponding to the fifth sub-fingerprint recognition region 555, a thirteenth lens 5436 (not illustrated) corresponding to the sixth sub-fingerprint recognition region 556, and a fourteenth lens 5437 (not illustrated) corresponding to the seventh sub-fingerprint recognition region 557.

According to an embodiment, the first guide structure 541 and the second guide structure 543 that correspond to the sub-fingerprint recognition regions 551, 552, 553, 554, 555, 556, and 557 may be disposed such that chief ray components (e.g., 5611, 5612, and 5615) of light reflected from the outermost portions of the sub-fingerprint recognition regions 551, 552, 553, 554, 555, 556, and 557 are incident on the image sensor 520 through the first guide structure 541 and the second guide structure 543.

According to an embodiment, the electronic device 500 may emit light sequentially or according to a specified pattern (or, a specified order) from light sources corresponding to the plurality of sub-fingerprint recognition regions 551, 552, 553, 554, 555, 556, and 557 through the display panel 510. According to another embodiment, the electronic device may simultaneously emit light from the light sources corresponding to the sub-fingerprint recognition regions 551, 552, 553, 554, 555, 556, and 557.

For example, 505c illustrates partial fingerprint images 581, 582, 583, 584, 585, 586, and 587 obtained by the image sensor 520 based on incident light corresponding to the sub-fingerprint recognition regions 551, 552, 553, 554, 555, 556, and 557. For example, referring to 505c, when the electronic device 500 emits light from the light source corresponding to the first sub-fingerprint recognition region 551, the image sensor 520 may obtain the first partial fingerprint image 581 (e.g., a fingerprint image corresponding to the first sub-fingerprint recognition region 551) for at least a portion of the external object making contact with the region 550, based on light incident on the image sensor 520 after reflected by the external object (e.g., a finger) making contact with the first sub-fingerprint recognition region 551. Thereafter, when the electronic device 500 emits light from the light source corresponding to the second sub-fingerprint recognition region 552, the image sensor 520 may obtain the second partial fingerprint image 582 (e.g., a fingerprint image corresponding to the second sub-fingerprint recognition region 552) for a portion of the external object, based on light incident on the image sensor 520 after reflected by the external object (e.g., a finger) making contact with the second sub-fingerprint recognition region 552. According to an embodiment, the electronic device 500 (e.g., the image sensor 520) may obtain the first to seventh partial fingerprint images 581, 582, 583, 584, 585, 586, and 587 corresponding to the first to seventh sub-fingerprint recognition regions 551, 552, 553, 554, 555, 556, and 557 by using a similar method. According to an embodiment, the electronic device 500 may obtain a fingerprint image corresponding to all the fingerprint recognition regions by processing the obtained first to seventh partial fingerprint images 581, 582, 583, 584, 585, 586, and 587. According to an embodiment, the partial fingerprint images 581, 582, 583, 584, 585, 586, and 587 corresponding to the sub-fingerprint recognition regions 551, 552, 553, 554, 555, 556, and 557, which are obtained by the electronic device 500, may be obtained as a reverse image for the fingerprint of the object. According to an embodiment, the electronic device 500 may obtain the entire fingerprint image by simultaneously emitting light from the light sources corresponding to the sub-fingerprint recognition regions 551, 552, 553, 554, 555, 556, and 557 and obtaining and processing the partial fingerprint images 581, 582, 583, 584, 585, 586, and 587 corresponding to the sub-fingerprint recognition regions 551, 552, 553, 554, 555, 556, and 557. For example, since the image sensor 520 of FIG. 5 has a size corresponding to the entire fingerprint recognition region 550, the partial fingerprint images 581, 582, 583, 584, 585, 586, and 587 may not overlap each other even when the image sensor 520 simultaneously obtains the partial fingerprint images 581, 582, 583, 584, 585, 586, and 587 corresponding to the sub-fingerprint recognition regions 551, 552, 553, 554, 555, 556, and 557. According to another embodiment, the electronic device 500 may obtain the entire fingerprint image by emitting light sequentially or according to a specified pattern (or, a specified order) from the light sources corresponding to sub-fingerprint recognition regions 551, 552, 553, 554, 555, 556, and 557 and sequentially processing the partial fingerprint images 581, 582, 583, 584, 585, 586, and 587 in the order obtained.

Figure 6:
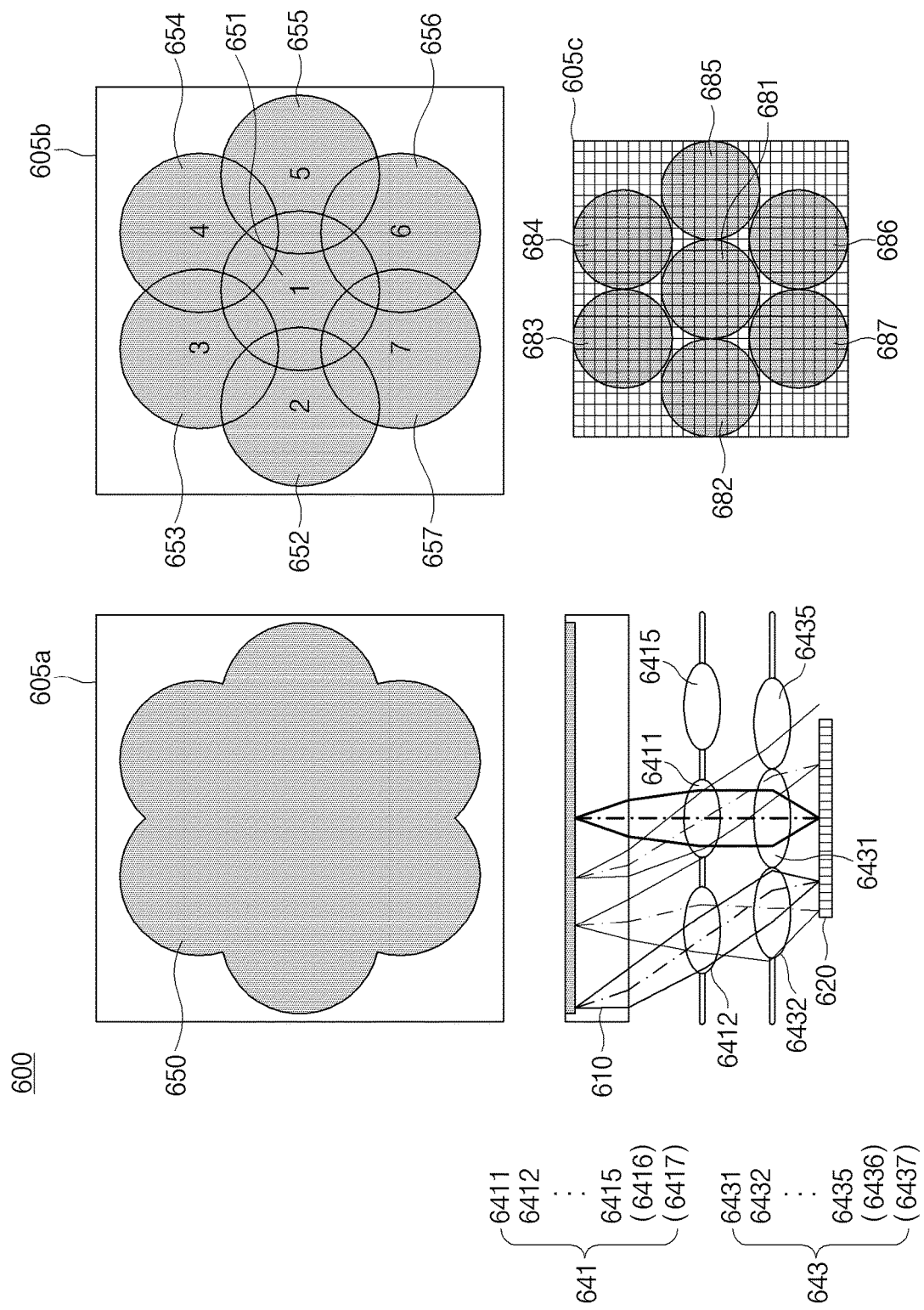
FIG. 6 is a view for describing a fingerprint recognition structure and a fingerprint recognition operation of an electronic device according to an embodiment of the disclosure.

FIG. 6 is a view for describing a fingerprint recognition structure and a fingerprint recognition operation of an electronic device 600 (e.g., the electronic device 101 of FIG. 1 or the electronic device 200 of FIG. 2) according to an embodiment of the disclosure.

According to an embodiment, the electronic device 600 may include a display panel 610 (e.g., the display panel 211 of FIG. 2 or the display panel 311a of FIG. 3A) that includes at least one light source, an image sensor 620 (e.g., the image sensor 220 of FIG. 2 or the image sensor 320a of FIG. 3A) disposed to obtain image information of an object external to the electronic device 600 through the at least one light source, a first guide structure 641 (e.g., the first guide structure 341 of FIG. 3A) disposed between the display panel 610 and the image sensor 620 and configured to change the direction of light that is incident thereon after emitted through a fingerprint recognition region 650 of the display panel 610 and reflected from the external object, and a second guide structure 643 (e.g., the second guide structure 343 of FIG. 3A) disposed between the first guide structure 641 and the image sensor 620 and configured to change the direction of the light that is incident thereon after passing through the first guide structure 641. For example, the first guide structure 641 may include a first lens 6411 corresponding to a first sub-fingerprint recognition region 651, a second lens 6412 corresponding to a second sub-fingerprint recognition region 652, a third lens 6413 (not illustrated) corresponding to a third sub-fingerprint recognition region 653, a fourth lens 6414 (not illustrated) corresponding to a fourth sub-fingerprint recognition region 654, a fifth lens 6415 corresponding to a fifth sub-fingerprint recognition region 655, a sixth lens 6416 (not illustrated) corresponding to a sixth sub-fingerprint recognition region 656, and a seventh lens 6417 (not illustrated) corresponding to a seventh sub-fingerprint recognition region 657. For example, the second guide structure 643 may include an eighth lens 6431 corresponding to the first sub-fingerprint recognition region 651, a ninth lens 6432 corresponding to the second sub-fingerprint recognition region 652, a tenth lens 6433 (not illustrated) corresponding to the third sub-fingerprint recognition region 653, an eleventh lens 6434 (not illustrated) corresponding to the fourth sub-fingerprint recognition region 654, a twelfth lens 6435 corresponding to the fifth sub-fingerprint recognition region 655, a thirteenth lens 6436 (not illustrated) corresponding to the sixth sub-fingerprint recognition region 656, and a fourteenth lens 6437 (not illustrated) corresponding to the seventh sub-fingerprint recognition region 657.

According to an embodiment, referring to 605a and 605b, the fingerprint recognition region 650 of the display panel 610 may include the plurality of sub-fingerprint recognition regions 651, 652, 653, 654, 655, 656, and 657. According to an embodiment, the sub-fingerprint recognition regions 651, 652, 653, 654, 655, 656, and 657 may at least partially overlap each other when the electronic device 600 is viewed from above (e.g., when the electronic device is viewed as illustrated in FIG. 3A (electronic device 300a) in the direction (the z-axis direction) that the display 310a faces).

According to an embodiment, the electronic device 600 may include the first guide structure 641 and the second guide structure 643 that correspond to the sub-fingerprint recognition regions 651, 652, 653, 654, 655, 656, and 657. For example, the first guide structure 641 and the second guide structure 643 may include a plurality of lenses that correspond to the sub-fingerprint recognition regions 651, 652, 653, 654, 655, 656, and 657. According to an embodiment, the form or arrangement of the lenses included in the first guide structure 641 may differ from the form or arrangement of the lenses included in the second guide structure 643. For example, the form or arrangement of the lenses included in the first guide structure 641 and/or the second guide structure 643 may be diversely set depending on properties of the lenses, such as the material, refractive index, size, or shape of the lenses. For example, the lenses included in the first guide structure 641 may have an arrangement having a wider gap than the lenses included in the second guide structure 643. For example, since the lenses of the first guide structure 641 and the lenses of the second guide structure 643 are disposed to have different forms and arrangements as illustrated in FIG. 6, the electronic device 600 may include the image sensor 620 having a smaller size than that in the embodiment illustrated in FIG. 5. For example, the image sensor 620 may have a smaller size than the area of the fingerprint recognition region 650. According to an embodiment, the image sensor 620 may be one image sensor as illustrated in FIG. 6 and may include a plurality of image sensors.

For example, 605c illustrates partial fingerprint images 681, 682, 683, 684, 685, 686, and 687 obtained by the image sensor 620 based on incident light corresponding to the sub-fingerprint recognition regions 651, 652, 653, 654, 655, 656, and 657. According to an embodiment, the electronic device 600 may obtain a fingerprint image corresponding to the entire fingerprint recognition region by processing the obtained first to seventh partial fingerprint images 681, 682, 683, 684, 685, 686, and 687. According to an embodiment, the electronic device 600 may obtain the entire fingerprint image by simultaneously emitting light from light sources corresponding to the sub-fingerprint recognition regions 651, 652, 653, 654, 655, 656, and 657 and obtaining and processing the partial fingerprint images 681, 682, 683, 684, 685, 686, and 687 corresponding to the sub-fingerprint recognition regions 651, 652, 653, 654, 655, 656, and 657. For example, although the image sensor 620 of FIG. 6 has a smaller size (area) than the image sensor 520 of FIG. 5, the first guide structure 641 and the second guide structure 643 may be disposed (arranged) such that the partial fingerprint images 681, 682, 683, 684, 685, 686, and 687 corresponding to the sub-fingerprint recognition regions 651, 652, 653, 654, 655, 656, and 657 are obtained by the image sensor 620 without overlapping each other, and thus the image sensor 620 may simultaneously obtain the partial fingerprint images 681, 682, 683, 684, 685, 686, and 687 corresponding to the sub-fingerprint recognition regions 651, 652, 653, 654, 655, 656, and 657. According to another embodiment, in the case of further decreasing the size of the image sensor 620, at least portions of the partial fingerprint images 681, 682, 683, 684, 685, 686, and 687 corresponding to the sub-fingerprint recognition regions 651, 652, 653, 654, 655, 656, and 657 may overlap each other in the image sensor 620 depending on the arrangement of the first guide structure 641 and the second guide structure 643. For example, the image sensor 620 may obtain a reverse image of a fingerprint of the object as the partial fingerprint images 681, 682, 683, 684, 685, 686, and 687. In this case, in order for the electronic device 600 to obtain the entire fingerprint image, a process of image processing and separating the overlapping partial fingerprint images 681, 682, 683, 684, 685, 686, and 687 may be required, and time and resource consumption depending on the image processing may be increased. According to an embodiment, by emitting light sequentially or according to a specified pattern (or, a specified order) from the light sources corresponding to the plurality of sub-fingerprint recognition regions 651, 652, 653, 654, 655, 656, and 657 and sequentially processing the partial fingerprint images 681, 682, 683, 684, 685, 686, and 687 in the order obtained, the electronic device 600 may reduce image processing time and resource consumption that are consumed by the overlapping partial fingerprint images 681, 682, 683, 684, 685, 686, and 687.

According to an embodiment, the electronic device 600 may provide an effect and a function similar to those of the embodiment of FIG. 5 by using the image sensor 620 having a smaller size depending on the form or arrangement of the lenses includes in the first guide structure 641 and the second guide structure 643.

Figure 7:
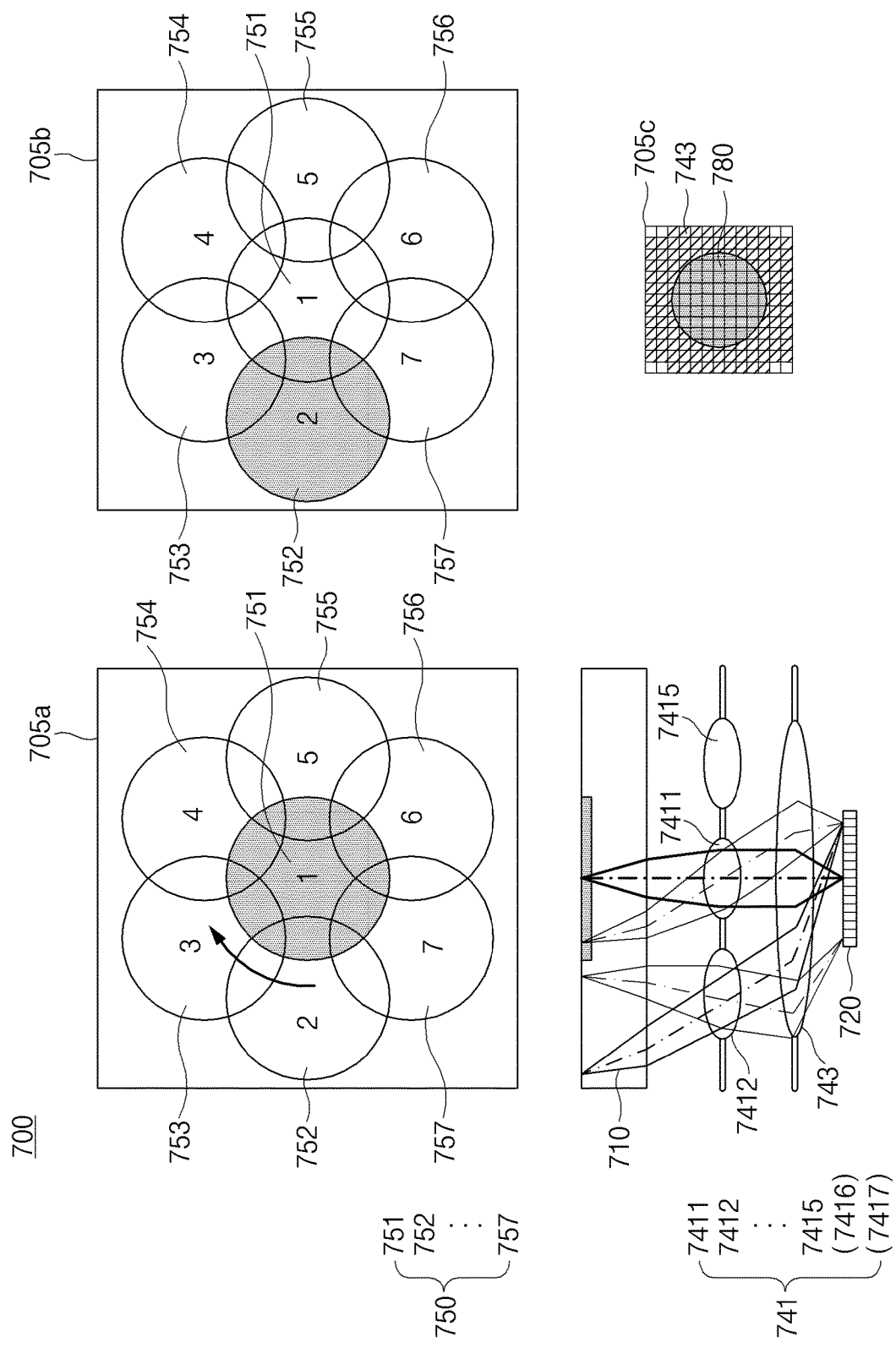
FIG. 7 is a view for describing a fingerprint recognition structure and a fingerprint recognition operation of an electronic device according to an embodiment of the disclosure.

FIG. 7 is a view for describing a fingerprint recognition structure and a fingerprint recognition operation of an electronic device 700 (e.g., the electronic device 101 of FIG. 1 or the electronic device 200 of FIG. 2) according to an embodiment of the disclosure.

According to an embodiment, the electronic device 700 may include a display panel 710 (e.g., the display panel 211 of FIG. 2 or the display panel 311a of FIG. 3A) that includes at least one light source, an image sensor 720 (e.g., the image sensor 220 of FIG. 2 or the image sensor 320a of FIG. 3A) disposed to obtain image information of an object external to the electronic device 700 through the at least one light source, a first guide structure 741 (e.g., the first guide structure 341 of FIG. 3A) disposed between the display panel 710 and the image sensor 720 and configured to change the direction of light that is incident thereon after emitted through a fingerprint recognition region 750 of the display panel 710 (e.g., sub-fingerprint recognition regions 751, 752, 753, 754, 755, 756, and 757) and reflected from the external object, and a second guide structure 743 (e.g., the second guide structure 343 of FIG. 3A) disposed between the first guide structure 741 and the image sensor 720 and configured to change the direction of the light that is incident thereon after passing through the first guide structure 741.

Referring to 705a and 705b, according to an embodiment, the fingerprint recognition region 750 of the display panel 710 may include the plurality of sub-fingerprint recognition regions 751, 752, 753, 754, 755, 756, and 757. According to an embodiment, the sub-fingerprint recognition regions 751, 752, 753, 754, 755, 756, and 757 may at least partially overlap each other when the electronic device 700 is viewed from one surface through which the display panel 710 is exposed.

According to an embodiment, the electronic device 700 may include the first guide structure 741 corresponding to the sub-fingerprint recognition regions 751, 752, 753, 754, 755, 756, and 757. For example, according to an embodiment, the first guide structure 741 may include a first lens 7411 corresponding to the first sub-fingerprint recognition region 751, a second lens 7412 corresponding to the second sub-fingerprint recognition region 752, a third lens 7413 (not illustrated) corresponding to the third sub-fingerprint recognition region 753, a fourth lens 7414 (not illustrated) corresponding to the fourth sub-fingerprint recognition region 754, a fifth lens 7415 corresponding to the fifth sub-fingerprint recognition region 755, a sixth lens 7416 (not illustrated) corresponding to the sixth sub-fingerprint recognition region 756, and a seventh lens 7417 (not illustrated) corresponding to the seventh sub-fingerprint recognition region 757. According to an embodiment, the second guide structure 743 may be formed of one lens. For example, the second guide structure 743 may change the direction of light incident thereon after passing through the lenses included in the first guide structure 741 and may allow the light to be incident on the image sensor 720.

According to an embodiment, the image sensor 720 may be disposed in a position corresponding to the first sub-fingerprint recognition region 751 located at the center among the plurality of the sub-fingerprint recognition regions 751, 752, 753, 754, 755, 756, and 757. For example, the image sensor 720 may have a size corresponding to the first sub-fingerprint recognition region 751, or may have a smaller size than the first sub-fingerprint recognition region 751. In a comparative example, the image sensor 720 of FIG. 7 may have a smaller size than the image sensors 420, 520, and 620 of FIGS. 4 to 6.

According to an embodiment, the electronic device 700 may emit light sequentially or according to a specified pattern or order from light sources corresponding to the plurality of sub-fingerprint recognition regions 751, 752, 753, 754, 755, 756, and 757 through the display panel 710.

According to an embodiment, when the electronic device 700 includes the image sensor 720 having a size corresponding to the sub-fingerprint recognition regions 751, 752, 753, 754, 755, 756, and 757, the electronic device 700 may use the image sensor 720 in sequence for the sub-fingerprint recognition regions 751, 752, 753, 754, 755, 756, and 757. For example, the same region of the image sensor 720 may be used for the sub-fingerprint recognition regions 751, 752, 753, 754, 755, 756, and 757. For example, 705c illustrates partial fingerprint images 681, 682, 683, 684, 685, 686, and 687 obtained by the image sensor 620 based on incident light corresponding to the sub-fingerprint recognition regions 751, 752, 753, 754, 755, 756, and 757. For example, in a case in which the image sensor 720 has a size corresponding to the sub-fingerprint recognition regions 751, 752, 753, 754, 755, 756, and 757, when the partial fingerprint images are obtained based on incident light reflected from the external object after emitted from a light source corresponding to the sub-fingerprint recognition regions 751, 752, 753, 754, 755, 756, and 757, the same image sensor 720 may obtain an image in a form in which images corresponding to the different sub-fingerprint recognition regions 751, 752, 753, 754, 755, 756, and 757 overlap each other.

For example, referring to 705c, as the size of the image sensor 720 is decreased, the partial fingerprint images corresponding to the sub-fingerprint recognition regions 751, 752, 753, 754, 755, 756, and 757 may be obtained in a common region 780 of the image sensor 720. In this case, the electronic device 700 may perform image processing to separate or extract images corresponding to the sub-fingerprint recognition regions 751, 752, 753, 754, 755, 756, and 757 from the superimposed image. For example, the electronic device 700 may perform deconvolution on the superimposed image to separate the images corresponding to the sub-fingerprint recognition regions 751, 752, 753, 754, 755, 756, and 757. For example, to separate the images corresponding to the sub-fingerprint recognition regions 751, 752, 753, 754, 755, 756, and 757, each of the sub-fingerprint recognition regions 751, 752, 753, 754, 755, 756, and 757 may include at least a partial overlapping region. For example, in the case of separating or extracting a plurality of overlapping images, the quality of a fingerprint image may not be ensured. According to an embodiment, the electronic device 700 may sequentially emit light from the light sources corresponding to the sub-fingerprint recognition regions 751, 752, 753, 754, 755, 756, and 757 and may sequentially obtain the partial fingerprint images corresponding to the sub-fingerprint recognition regions 751, 752, 753, 754, 755, 756, and 757.

For example, the electronic device 700 may emit light from the light source corresponding to the first sub-fingerprint recognition region 751 disposed at the center among the sub-fingerprint recognition regions through the display panel 710 and may sequentially emit light from the light sources corresponding to the second sub-fingerprint recognition region 752, the third sub-fingerprint recognition region 753, the fourth sub-fingerprint recognition region 754, the fifth sub-fingerprint recognition region 755, the sixth sub-fingerprint recognition region 756, and the seventh sub-fingerprint recognition region 757. For example, when the electronic device 700 emits light from the light source corresponding to the first sub-fingerprint recognition region 751, the image sensor 720 may obtain a first partial fingerprint image (e.g., a fingerprint image corresponding to the first sub-fingerprint recognition region 751) for a portion of the external object, based on light incident on the image sensor 720 after reflected by the external object (e.g., a finger) making contact with the first sub-fingerprint recognition region 751. Thereafter, when the electronic device 700 emits light from the light source corresponding to the second sub-fingerprint recognition region 752, the image sensor 720 may obtain a second partial fingerprint image (e.g., a fingerprint image corresponding to the second sub-fingerprint recognition region 752) for a portion of the external object, based on light incident on the image sensor 720 after reflected by the external object (e.g., a finger) making contact with the second sub-fingerprint recognition region 752.

According to an embodiment, the electronic device 700 may obtain first to seventh partial fingerprint images corresponding to the first to seventh sub-fingerprint recognition regions 751, 752, 753, 754, 755, 756, and 757 by using a similar method. According to an embodiment, the electronic device 700 may obtain a fingerprint image corresponding to the entire fingerprint recognition region 750 by processing the obtained first to seventh partial fingerprint images. According to an embodiment, by emitting light sequentially or according to a specified pattern (or, a specified order) from the light sources corresponding to the plurality of sub-fingerprint recognition regions 751, 752, 753, 754, 755, 756, and 757 and sequentially processing the partial fingerprint images in the order in which the partial fingerprint images are obtained in the common region 780, the electronic device 700 may reduce image processing time and resource consumption that are consumed by the overlapping partial fingerprint images.

According to an embodiment, the electronic device 700 may variably set the entire fingerprint recognition region 750. For example, when an obtained fingerprint image is compared with registered biometric information of a user (e.g., a registered fingerprint image of the user), an external factor (e.g., weather, the user's age, or gender) may affect the image obtained through the image sensor 720. According to an embodiment, the electronic device 700 may emit light from a light source corresponding to one sub-fingerprint recognition region (e.g., the first sub-fingerprint recognition region 751) among the sub-fingerprint recognition regions and may obtain first image information, based on incident light incident on the image sensor 720 after reflected from the external object. According to an embodiment, when the first image information does not satisfy a criterion set to obtain biometric information of the object, the electronic device 700 may emit light from a light source corresponding to another sub-fingerprint recognition region (e.g., the second sub-fingerprint recognition region 752) in a specified order through the display panel 710 and may obtain second image information, based on incident light incident on the image sensor 720 after reflected from the external object. According to an embodiment, the electronic device 700 may obtain biometric information of the object, based on the first image information and the second image information. For example, based on the first image information and the second image information, the electronic device 700 may obtain a fingerprint image of the object making contact with the first sub-fingerprint recognition region and the second sub-fingerprint recognition region. According to an embodiment, the electronic device 700 may emit light sequentially or in a stepwise manner through the light sources corresponding to the first to seventh sub-fingerprint recognition regions 751, 752, 753, 754, 755, 756, and 757 depending on situations, may emit light according to a specified pattern (order), may emit light from a light source corresponding to one sub-fingerprint recognition region at a time, may simultaneously emit light from light sources corresponding to at least two sub-fingerprint recognition regions, or may emit light from a light source corresponding to the entire sub-fingerprint recognition region. For example, the electronic device 700 may variably emit light only for at least some of the sub-fingerprint recognition regions 751, 752, 753, 754, 755, 756, and 757 depending on situations. For example, the electronic device 700 may variably set the entire fingerprint recognition region 750 including at least one of the sub-fingerprint recognition regions 751, 752, 753, 754, 755, 756, and 757 depending on situations.

An electronic device according to an embodiment of the disclosure (e.g., the electronic device 101 of FIG. 1, the electronic device 200 of FIG. 2, the electronic device 300*a* of FIG. 3A, the electronic device 300*b* of FIG. 3B, the electronic device 400 of FIG. 4, the electronic device 500 of FIG. 5, the electronic device 600 of FIG. 6, or the electronic device 700 of FIG. 7) may include a display panel (e.g., the display device 160 of FIG. 1 and the display panels 211, 310*a*, 310*b*, 410, 510, 610, and 710 of FIGS. 2, 3A, 3B, and 4 to 7) including at least one light source, an image sensor (e.g., the sensor module 176 of FIG. 1 and the image sensors 220, 320*a*, 320*b*, 420, 520, 620, and 720 of FIGS. 2, 3A, 3B, and 4 to 7) disposed to receive incident light incident thereon by reflection of light emitted through the at least one light source by an object external to the electronic device, a first guide structure (e.g., the first guide structures 341, 441, 541, 641, and 741 of FIGS. 3A, 3B, and 4 to 7) that is disposed between the display panel and the image sensor and that changes a direction of the incident light incident through a fingerprint recognition region (e.g., the fingerprint recognition regions 350, 450, 550, 650, and 750 of FIGS. 3A, 3B, and 4 to 7) of the display panel, a second guide structure (e.g., the second guide structures 343, 443, 543, 643, and 743 of FIGS. 3A, 3B, and 4 to 7) that is disposed between the first guide structure and the image sensor and that changes the direction of the incident light incident through the first guide structure, and a processor (e.g., the processor 120 of FIG. 1 or the processor 240 of FIG. 2) operationally connected with the display panel and the image sensor.

According to an embodiment, the processor may be configured to obtain image information through the image sensor, based on at least a portion of the incident light incident through the first guide structure and the second guide structure.

According to an embodiment, the fingerprint recognition region may include a plurality of sub-fingerprint recognition regions (e.g., the sub-fingerprint recognition regions 551 to 557, 651 to 657, or 751 to 757 of FIGS. 5 to 7).

According to an embodiment, the image sensor may have a size smaller than or equal to a size of the fingerprint recognition region including the plurality of sub-fingerprint recognition regions.

According to an embodiment, the processor may be configured to obtain biometric information of the object, based on the image information.

According to an embodiment, each of the first guide structure and the second guide structure may include at least one lens corresponding to the plurality of sub-fingerprint recognition regions.

According to an embodiment, the at least one lens included in the first guide structure and the at least one lens included in the second guide structure may have different forms or arrangements.

According to an embodiment, the plurality of sub-fingerprint recognition regions may be disposed to at least partially overlap each other when the electronic device is viewed from one surface through which the display panel is exposed to the outside.

According to an embodiment, the first guide structure may include a plurality of lenses corresponding to the plurality of sub-fingerprint recognition regions. According to an embodiment, the second guide structure may include one lens.

According to an embodiment, the processor may be configured to sequentially emit light from light sources corresponding to the plurality of sub-fingerprint recognition regions through the display panel.

According to an embodiment, the processor may be configured to emit light from light sources corresponding to the plurality of sub-fingerprint recognition regions according to a specified pattern through the display panel.

According to an embodiment, the processor may be configured to emit light from a light source corresponding to a sub-fingerprint recognition region disposed at a center through the display panel and to obtain image information, based on incident light incident on the image sensor through the first guide structure and the second guide structure by reflection of the light emitted from the light source by the external object.

According to an embodiment, the processor may be configured to emit light from a light source corresponding to another sub-fingerprint recognition region according to a specified order through the display panel, when the image information does not satisfy a criterion set to obtain biometric information of the object, to obtain another piece of image information, based on incident light incident through the image sensor by reflection of the light emitted from the light source corresponding to the other sub-fingerprint recognition region by the external object, and to obtain biometric information of the object, based on the image information and the other image information.

According to an embodiment, the electronic device may further include a touch sensor (e.g., the touch sensor 250 of FIG. 2). According to an embodiment, the processor may be configured to emit light from a light source corresponding to the fingerprint recognition region through the display panel, when the touch sensor detects that the external object makes contact with the fingerprint recognition region.

According to an embodiment, the electronic device may further include a memory (e.g., the memory 130 of FIG. 1 or the memory 230 of FIG. 2). According to an embodiment, the processor may be configured to perform a specified function, based on whether the obtained biometric information corresponds to a user's biometric information stored in the memory.

Figure 8:
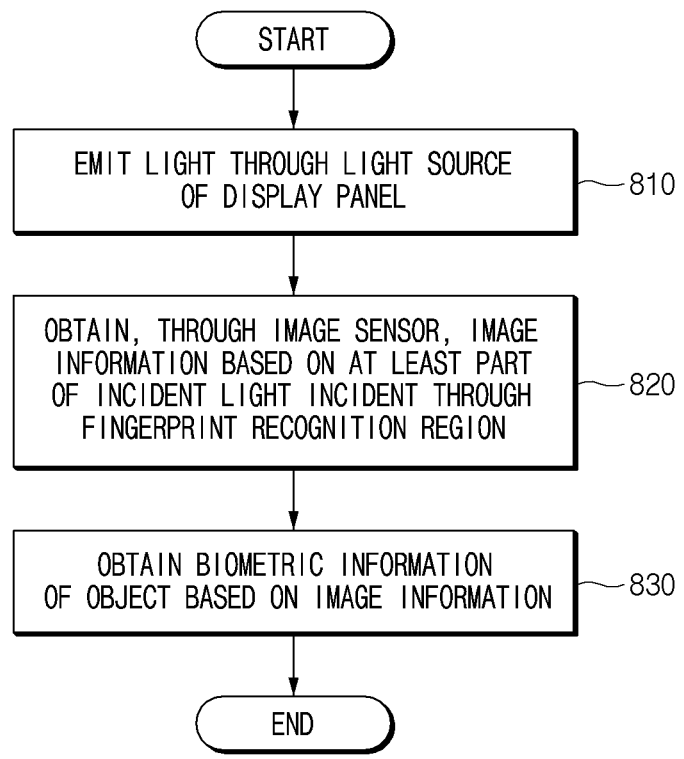
FIG. 8 is a flowchart of a fingerprint recognition method of an electronic device according to an embodiment of the disclosure.

FIG. 8 is a flowchart of a fingerprint recognition method of an electronic device (e.g., the electronic device 101 of FIG. 1, the electronic device 200 of FIG. 2, the electronic device 300*a* of FIG. 3A, the electronic device 300*b* of FIG. 3B, the electronic device 400 of FIG. 4, the electronic device 500 of FIG. 5, the electronic device 600 of FIG. 6, or the electronic device 700 of FIG. 7) according to an embodiment of the disclosure.

According to an embodiment, the electronic device may include a display panel (e.g., the display device 160 of FIG. 1 or the display panel 211, 311*a*, 311*b*, 410, 510, 610, or 710 of FIGS. 2, 3A, 3B, and 4 to 7) including at least one light source, and an image sensor (e.g., the sensor module 176 of FIG. 1 or the image sensor 220, 320*a*, 320*b*, 420, 520, 620, or 720 of FIGS. 2, 3A, 3B, and 4 to 7). According to an embodiment, the electronic device may include at least one of the fingerprint recognition structures of the electronic devices illustrated in FIGS. 3A, 3B, and 4 to 7.

According to an embodiment, in operation 810, the electronic device may emit light through the at least one light source included in the display panel. For example, the display panel may include a fingerprint recognition region (e.g., the fingerprint recognition region 350, 450, 550, 650, or 750 of FIGS. 3A, 3B, and 4 to 7). According to an embodiment, the electronic device may emit light through a light source corresponding to the fingerprint recognition region through the display panel.

According to an embodiment, in operation 820, the electronic device may obtain image information, based on at least a portion of incident light incident on the image sensor through the fingerprint recognition region. For example, the light emitted through the light source by the electronic device in operation 810 may be reflected by an external object (e.g., a finger (fingerprint)) making contact with the fingerprint recognition region and may be incident through the fingerprint recognition region. For example, incident light reflected by the external object after emitted through the fingerprint recognition region of the display panel may be incident on the image sensor through a first guide structure (e.g., a first lens structure) (e.g., the first guide structure 341, 441, 541, 641, or 741 of FIGS. 3A, 3B, and 4 to 7) and a second guide structure (e.g., a second lens structure) (e.g., the second guide structure 343, 443, 543, 643, or 743 of FIGS. 3A, 3B, and 4 to 7). According to an embodiment, the image sensor may obtain image information (e.g., a fingerprint image) of the object, based on at least a portion of the incident light.

According to an embodiment, in operation 830, the electronic device may obtain biometric information (e.g., fingerprint information) of the object, based on the image information. According to an embodiment, the electronic device may perform a specified function (e.g., execution of user authentication, a specified operation, a function, or an application), based on whether the obtained biometric information corresponds to a user's biometric information (e.g., the user's registered fingerprint information) stored in a memory (e.g., the memory 130 of FIG. 1 or the memory 230 of FIG. 2).

Figure 9:
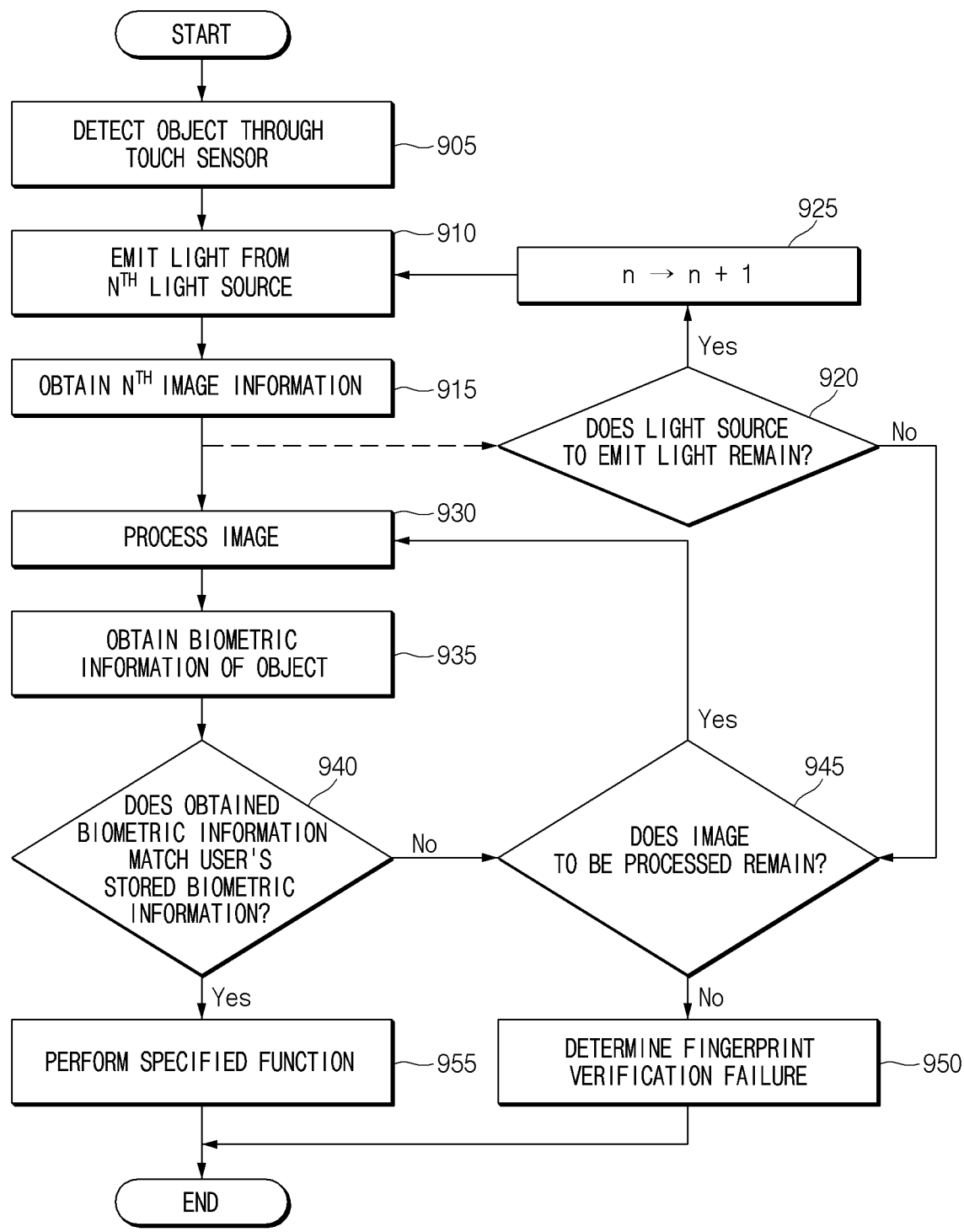
FIG. 9 is a flowchart of a fingerprint recognition method of an electronic device according to an embodiment of the disclosure.

FIG. 9 is a flowchart of a fingerprint recognition method of an electronic device (e.g., the electronic device 101 of FIG. 1, the electronic device 200 of FIG. 2, the electronic device 300a of FIG. 3A, the electronic device 300b of FIG. 3B, the electronic device 400 of FIG. 4, the electronic device 500 of FIG. 5, the electronic device 600 of FIG. 6, or the electronic device 700 of FIG. 7) according to an embodiment of the disclosure.

According to an embodiment, the electronic device may include a display panel (e.g., the display device 160 of FIG. 1 or the display panel 211, 310a, 310b, 410, 510, 610, or 710 of FIGS. 2, 3A, 3B, and 4 to 7) including at least one light source, and an image sensor (e.g., the sensor module 176 of FIG. 1 or the image sensor 220, 320a, 320b, 420, 520, 620, or 720 of FIGS. 2, 3A, 3B, and 4 to 7). According to an embodiment, the electronic device may include at least one of the fingerprint recognition structures of the electronic devices illustrated in FIGS. 5, 6, and 7.

According to an embodiment, in operation 905, the electronic device may detect an object through a touch sensor (e.g., the input device 150 of FIG. 1, the sensor module 176 of FIG. 1, or the touch sensor 250 of FIG. 2). According to an embodiment, the display panel of the electronic device may include a fingerprint recognition region (e.g., the fingerprint recognition region 350, 450, 550, 650, or 750 of FIGS. 3A, 3B, and 4 to 7). For example, through the touch sensor, the electronic device may detect the external object making contact with the fingerprint recognition region. According to an embodiment, the fingerprint recognition region may include at least two sub-fingerprint recognition regions (e.g., the sub-fingerprint recognition regions 551 to 557, 651 to 657, or 751 to 757 of FIGS. 5 to 7).

According to an embodiment, in operation 910, the electronic device may emit light from an $n^{th}$ light source (e.g., a light source corresponding to an $n^{th}$ sub-fingerprint recognition region). According to an embodiment, the $n^{th}$ light source may refer to at least one light source corresponding to a predetermined region. For example, when the electronic device detects the object making contact with the fingerprint recognition region in operation 905, the electronic device may, in operation 910, emit light through a light source corresponding to a first sub-fingerprint recognition region.

According to an embodiment, in operation 915, the electronic device may obtain $n^{th}$ image information. For example, the light emitted by the electronic device in operation 910 may be reflected from the external object and may be incident on the image sensor. For example, the electronic device may obtain the $n^{th}$ image (e.g., first image) information, based on at least a portion of incident light incident on the image sensor by reflection of the light emitted through the light source by the external object. For example, the first image information may include a first partial fingerprint image of the object making contact with the first sub-fingerprint recognition region.

According to an embodiment, in operation 920, the electronic device may determine whether a light source to emit light remains. For example, the electronic device may determine whether a light source corresponding to a sub-fingerprint recognition region that does not emit light remains among the light sources corresponding to the plurality of sub-fingerprint recognition regions. According to an embodiment, when a light source to emit light remains, the electronic device may, in operation 925, determine the next order (an $(n+1)^{th}$ light source) after the $n^{th}$ light source. According to an embodiment, when a light source to emit light remains, the electronic device may emit light through the $(n+1)^{th}$ light source (e.g., a light source corresponding to a second sub-fingerprint recognition region) according to a specified order after operation 925. According to an embodiment, the electronic device may simultaneously perform operations 920 and 925 while performing operation 930. For example, the electronic device may prepare for a next-order operation while performing operation 930. According to an embodiment, the electronic device may emit light from the $(n+1)^{th}$ light source and may prepare to obtain $(n+1)^{th}$ image information. For example, the electronic device may determine whether the $(n+1)^{th}$ light source that has not yet emitted light remains, while obtaining and processing the $n^{th}$ image information corresponding to the $n^{th}$ light source and may emit light from the $(n+1)^{th}$ light source to perform an operation of obtaining the $(n+1)^{th}$ image information.

According to an embodiment, when a light source to emit light does not remain, the electronic device may, in operation 945, determine whether a fingerprint image to be processed remains and may perform subsequent operations.

According to an embodiment, in operation 930, the electronic device may process the obtained image information. For example, the electronic device may correct at least one piece of obtained information, may integrate at least two pieces of image information, or may separate or extract some information from obtained image information. According to an embodiment, every time the electronic device obtains image information corresponding to each sub-fingerprint recognition region, the electronic device may accumulate and process the obtained image information. According to an embodiment, while processing the $n^{th}$ image information in operation 930, the electronic device may, through operations 910 and 915, may emit light from the light source corresponding to an $(n+1)^{th}$ sub-fingerprint recognition region and may obtain the $(n+1)^{th}$ image information. For example, the electronic device may perform first image processing while obtaining second image information.

According to an embodiment, after operation 915, the electronic device may simultaneously perform operations 920 and 930, or may independently perform operations 920 and 930.

According to an embodiment, in operation 935, the electronic device may obtain biometric information of the object. For example, the electronic device may obtain a fingerprint image of the external object (e.g., a finger (fingerprint)) making contact with the fingerprint recognition region, based on the image information processing in operation 930. According to an embodiment, the electronic device may obtain biometric information (e.g., a fingerprint image), based on the at least one image processed in operation 930. For example, the electronic device may obtain a fingerprint image of the external object, based on a plurality of processed images. For example, when the $n^{th}$ image (e.g., the first partial fingerprint image) and the $(n+1)^{th}$ image (e.g., the second partial fingerprint image) are obtained and processed, the electronic device may obtain biometric information (e.g., a fingerprint image), based on the $n^{th}$ image and/or the $(n+1)^{th}$ image.

According to an embodiment, in operation 940, the electronic device may determine whether the biometric information (e.g., the fingerprint image) of the object matches a user's stored biometric information (e.g., the user's registered fingerprint image).

According to an embodiment, when it is determined that the biometric information of the object matches the user's stored biometric information, the electronic device may, in operation 955, perform a specified function (e.g., execution of user authentication, a specified operation, a function, or an application).

According to an embodiment, when it is determined that the biometric information of the object does not match the user's stored biometric information, the electronic device may, in operation 945, determine whether an image to be processed remains. According to an embodiment, when the image to be processed remains, the electronic device may, in operation 930, process the image. For example, when the fingerprint image generated based on the result obtained by processing the $n^{th}$ image by the electronic device does not match the user's stored biometric information, the electronic device may determine whether the unprocessed $(n+1)^{th}$ image remains. For example, when it is determined that the unprocessed $(n+1)^{th}$ image remains, the electronic device may, in operation 930, process the $(n+1)^{th}$ image. According to an embodiment, when it is determined that an image to be processed does not remain, the electronic device may, in operation 950, determine fingerprint verification failure. For example, when the electronic device fails to obtain biometric information matching the user's biometric information even though the electronic device processes a plurality of images (e.g., partial fingerprint images) obtained by emitting light from all light sources corresponding to a plurality of light sources (e.g., a plurality of partial fingerprint recognition regions), the electronic device may determine fingerprint verification failure. According to an embodiment, when determining the fingerprint verification failure, the electronic device may provide notification or feedback indicating the fingerprint verification failure to the user through an output device (e.g., the display device 160, the sound output device 155, the audio module 170, and/or the haptic module 179 of FIG. 1 or the display 210 of FIG. 2).

According to an embodiment, the electronic device may repeatedly perform operations 930 to 955 by image processing accumulated image information. For example, when the biometric information (e.g., the first partial fingerprint image) obtained through the first image information does not match the user's biometric information, the electronic device may determine whether the biometric information obtained through the first image information and/or the second image information (e.g., the second partial fingerprint image) matches the user's biometric information. For example, the electronic device may repeat corresponding operations until biometric information obtained based on the entire image information obtained for all sub-fingerprint recognition regions does not match the user's stored biometric information. According to an embodiment, when the biometric information obtained based on the entire image information obtained for all the sub-fingerprint recognition regions does not match the user's stored biometric information, the electronic device may, in operation 950, determine fingerprint verification failure.

A fingerprint recognition method of an electronic device (e.g., the electronic device 101 of FIG. 1, the electronic device 200 of FIG. 2, the electronic device 300a of FIG. 3A, the electronic device 300b of FIG. 3B, the electronic device 400 of FIG. 4, the electronic device 500 of FIG. 5, the electronic device 600 of FIG. 6, or the electronic device 700 of FIG. 7) including a display panel (e.g., the display device 160 of FIG. 1 and the display panels 211, 310a, 310b, 410, 510, 610, and 710 of FIGS. 2, 3A, 3B, and 4 to 7), an image sensor (e.g., the sensor module 176 of FIG. 1 and the image sensors 220, 320a, 320b, 420, 520, 620, and 720 of FIGS. 2, 3A, 3B, and 4 to 7), a first guide structure (e.g., the first guide structures 341, 441, 541, 641, and 741 of FIGS. 3A, 3B, and 4 to 7) that changes a direction of incident light incident through a fingerprint recognition region (e.g., the fingerprint recognition regions 350, 450, 550, 650, and 750 of FIGS. 3A, 3B, and 4 to 7) of the display panel, and a second guide structure (e.g., the second guide structures 343, 443, 543, 643, and 743 of FIGS. 3A, 3B, and 4 to 7) that changes a direction of incident light incident through the first guide structure may include obtaining image information of an external object, based on at least a portion of incident light incident on the image sensor through the first guide structure and the second guide structure by reflection of light emitted through the display panel by the external object and obtaining biometric information of the object, based on the image information.

According to an embodiment, the fingerprint recognition region may include a plurality of sub-fingerprint recognition regions (e.g., the sub-fingerprint recognition regions 551 to 557, 651 to 657, or 751 to 757 of FIGS. 5 to 7), and the image sensor may have a size smaller than or equal to a size of the fingerprint recognition region including the plurality of sub-fingerprint recognition regions.

According to an embodiment, the plurality of sub-fingerprint recognition regions may be disposed to at least partially overlap each other when the electronic device is viewed from one surface through which the display panel is exposed to the outside.

According to an embodiment, each of the first guide structure and the second guide structure may include at least one lens corresponding to the plurality of sub-fingerprint recognition regions, and the at least one lens included in the first guide structure and the at least one lens included in the second guide structure may have different forms or arrangements.

According to an embodiment, the obtaining of the image information may include emitting light from a light source corresponding to a sub-fingerprint recognition region disposed at a center through the display panel and obtaining the image information, based on incident light incident on the image sensor through the first guide structure and the second guide structure by reflection of the emitted light by the external object.

According to an embodiment, the fingerprint recognition method may further include emitting light from a light source corresponding to another sub-fingerprint recognition region according to a specified order through the display panel, when the image information does not satisfy a criterion set to obtain biometric information of the object, obtaining another piece of image information, based on incident light incident on the image sensor by reflection of the light emitted from the light source corresponding to the other sub-fingerprint recognition region by the external object, and obtaining biometric information of the object, based on the image information and the other image information.

According to an embodiment, the fingerprint recognition method may further include emitting light from a light source corresponding to the fingerprint recognition region through the display panel, when a touch sensor of the electronic device detects that the external object makes contact with the fingerprint recognition region.

According to an embodiment, the fingerprint recognition method may further include emitting light sequentially or according to a specified pattern from light sources corresponding to the plurality of sub-fingerprint recognition regions through the display panel.

According to an embodiment, the fingerprint recognition method may further include performing a specified function, based on whether the obtained biometric information corresponds to a user's stored biometric information.

According to an embodiment, the first guide structure may include a plurality of lenses corresponding to the plurality of sub-fingerprint recognition regions, and the second guide structure may include one lens.

The electronic device according to various embodiments disclosed in the disclosure may be various types of devices. The electronic device may include, for example, a portable communication device (e.g., a smartphone), a computer device, a portable multimedia device, a mobile medical appliance, a camera, a wearable device, or a home appliance. The electronic device according to an embodiment of the disclosure should not be limited to the above-mentioned devices.

It should be understood that various embodiments of the disclosure and terms used in the embodiments do not intend to limit technical features disclosed in the disclosure to the particular embodiment disclosed herein; rather, the disclosure should be construed to cover various modifications, equivalents, or alternatives of embodiments of the disclosure. With regard to description of drawings, similar or related components may be assigned with similar reference numerals. In the disclosure disclosed herein, each of the expressions "A or B", "at least one of A and B", "at least one of A or B", "A, B, or C", "one or more of A, B, and C", or "one or more of A, B, or C", and the like used herein may include any and all combinations of one or more of the associated listed items. The expressions, such as "a first", "a second", "the first", or "the second", may be used merely for the purpose of distinguishing a component from the other components, but do not limit the corresponding components in other aspect (e.g., the importance or the order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

The term "module" used in the disclosure may include a unit implemented in hardware, software, or firmware and may be interchangeably used with the terms "logic", "logical block", "part" and "circuit". The "module" may be a minimum unit of an integrated part or may be a part thereof. The "module" may be a minimum unit for performing one or more functions or a part thereof. For example, according to an embodiment, the "module" may include an application-specific integrated circuit (ASIC).

Various embodiments of the disclosure may be implemented by software (e.g., the program 140) including an instruction stored in a machine-readable storage medium (e.g., an internal memory 136 or an external memory 138) readable by a machine (e.g., the electronic device 101). For example, the processor (e.g., the processor 120) of a machine (e.g., the electronic device 101) may call the instruction from the machine-readable storage medium and execute the instructions thus called. This means that the machine may perform at least one function based on the called at least one instruction. The one or more instructions may include a code generated by a compiler or executable by an interpreter. The machine-readable storage medium may be provided in the form of non-transitory storage medium. Here, the term "non-transitory", as used herein, means that the storage medium is tangible, but does not include a signal (e.g., an electromagnetic wave). The term "non-transitory" does not differentiate a case where the data is permanently stored in the storage medium from a case where the data is temporally stored in the storage medium.

According to an embodiment, the method according to various embodiments disclosed in the disclosure may be provided as a part of a computer program product. The computer program product may be traded between a seller and a buyer as a product. The computer program product may be distributed in the form of machine-readable storage medium (e.g., a compact disc read only memory (CD-ROM)) or may be directly distributed (e.g., download or upload) online through an application store (e.g., a Play Store™) or between two user devices (e.g., the smartphones). In the case of online distribution, at least a portion of the computer program product may be temporarily stored or generated in a machine-readable storage medium such as a memory of a manufacturer's server, an application store's server, or a relay server.

According to various embodiments, each component (e.g., the module or the program) of the above-described components may include one or plural entities. According to various embodiments, at least one or more components of the above components or operations may be omitted, or one or more components or operations may be added. Alternatively or additionally, some components (e.g., the module or the program) may be integrated in one component. In this case, the integrated component may perform the same or similar functions performed by each of the corresponding components prior to the integration. According to various embodiments, operations performed by a module, a programming, or other components may be executed sequentially, in parallel, repeatedly, or in a heuristic method, or at least some operations may be executed in different sequences, omitted, or other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a display panel including at least one light source;
   an image sensor disposed to receive incident light incident thereon by reflection of light emitted through the at least one light source by an object external to the electronic device;
   a first guide structure disposed between the display panel and the image sensor and configured to change a direction of the incident light incident through a fingerprint recognition region of the display panel;
   a second guide structure disposed between the first guide structure and the image sensor and configured to change the direction of the incident light incident through the first guide structure; and
   a processor operationally connected with the display panel and the image sensor,
   wherein the processor is configured to:
      obtain image information through the image sensor, based on at least a portion of the incident light incident through the first guide structure and the second guide structure,
   wherein the fingerprint recognition region includes a plurality of sub-fingerprint recognition regions,
   wherein the first guide structure includes a plurality of lenses arranged spaced apart from each other,
   wherein a center of at least one lens among the plurality of lenses of the first guide structure is out of alignment with a center of at least one lens of the second guide structure in a direction from the display panel to the image sensor, and
   wherein a center of at least one other lens among the plurality of lenses of the first guide structure is aligned with a center of at least one other lens of the second guide structure in the direction from the display panel to the image sensor.

2. The electronic device of claim 1, wherein the processor is further configured to:
   obtain biometric information of the object based on the image information.

3. The electronic device of claim 1,
   wherein each of the first guide structure and the second guide structure includes at least one lens corresponding to the plurality of sub-fingerprint recognition regions, and
   wherein the at least one lens included in the first guide structure and the at least one lens included in the second guide structure have different forms or arrangements.

4. The electronic device of claim 1, wherein the plurality of sub-fingerprint recognition regions are disposed to at least partially overlap each other when the electronic device is viewed from one surface through which the display panel is exposed to an outside of the electronic device.

5. The electronic device of claim 4,
   wherein the first guide structure includes the plurality of lenses corresponding to the plurality of sub-fingerprint recognition regions, and
   wherein the second guide structure includes one lens.

6. The electronic device of claim 4, wherein the processor is further configured to:
   sequentially emit light through the display panel from light sources corresponding to the plurality of sub-fingerprint recognition regions.

7. The electronic device of claim 4, wherein the processor is further configured to:
   emit light through the display panel from light sources corresponding to the plurality of sub-fingerprint recognition regions according to a specified pattern.

8. The electronic device of claim 1, wherein the processor is further configured to:
   emit light through the display panel from a first light source corresponding to a sub-fingerprint recognition region disposed at a center of the fingerprint recognition region, and
   obtain image information based on the incident light incident on the image sensor through the first guide structure and the second guide structure by reflection of the light emitted from the first light source by the object.

9. The electronic device of claim 8, wherein the processor is further configured to:
   emit light through the display panel from a second light source corresponding to another sub-fingerprint recognition region according to a specified order based on the image information not satisfying a criterion set to obtain biometric information of the object,
   obtain another piece of image information based on the incident light incident through the image sensor by reflection of the light emitted from the second light source corresponding to the other sub-fingerprint recognition region by the object, and
   obtain the biometric information of the object based on the image information and the other piece of image information.

10. The electronic device of claim 1, further comprising:
    a touch sensor,
    wherein the processor is further configured to:
       emit light through the display panel from a light source corresponding to the fingerprint recognition region based on the touch sensor detecting that the object contacts the fingerprint recognition region.

11. The electronic device of claim 2, further comprising:
    a memory,
    wherein the processor is further configured to:
       perform a specified function based on the biometric information of the object corresponding to a user's biometric information stored in the memory.

12. A fingerprint recognition method of an electronic device including a display panel, an image sensor, a first guide structure configured to change a direction of incident light incident through a fingerprint recognition region of the display panel, and a second guide structure configured to change a direction of incident light incident through the first guide structure, the fingerprint recognition method comprising:
    obtaining image information of an object external to the electronic device based on at least a portion of incident light incident on the image sensor through the first guide structure and the second guide structure by reflection of light emitted through the display panel by the object; and
    obtaining biometric information of the object based on the image information,
    wherein the fingerprint recognition region includes a plurality of sub-fingerprint recognition regions,
    wherein the first guide structure includes a plurality of lenses arranged spaced apart from each other, wherein a center of at least one lens among the plurality of lenses of the first guide structure is out of alignment with a center of at least one lens of the second guide structure in a direction from the display panel to the image sensor, and wherein a center of at least one other lens among the plurality of lenses of the first guide structure is aligned with a center of at least one other lens of the second guide structure in the direction from the display panel to the image sensor.

13. The fingerprint recognition method of claim 12, wherein the plurality of sub-fingerprint recognition regions are disposed to at least partially overlap each other when the electronic device is viewed from one surface through which the display panel is exposed to outside the electronic device.

14. The fingerprint recognition method of claim 12, wherein each of the first guide structure and the second guide structure includes at least one lens corresponding to the plurality of sub-fingerprint recognition regions, and wherein the at least one lens included in the first guide structure and the at least one lens included in the second guide structure have different forms or arrangements.

15. The fingerprint recognition method of claim 13, wherein the obtaining of the image information comprises:

emitting light through the display panel from a first light source corresponding to a sub-fingerprint recognition region disposed at a center of the fingerprint recognition region; and obtaining the image information based on the incident light incident on the image sensor through the first guide structure and the second guide structure by reflection of the emitted light by the object.

16. The fingerprint recognition method of claim 15, further comprising:

emitting light through the display panel from a second light source corresponding to another sub-fingerprint recognition region according to a specified order based on the image information not satisfying a criterion set to obtain the biometric information of the object;

obtaining another piece of image information based on the incident light incident on the image sensor by reflection of the light emitted from the second light source corresponding to the other sub-fingerprint recognition region by the object; and obtaining the biometric information of the object based on the image information and the other piece of image information.

17. The fingerprint recognition method of claim 12, further comprising:

emitting light through the display panel from a light source corresponding to the fingerprint recognition region based on a touch sensor of the electronic device detecting that the object contacts the fingerprint recognition region.

18. The fingerprint recognition method of claim 13, further comprising:

emitting light through the display panel sequentially or according to a specified pattern from light sources corresponding to the plurality of sub-fingerprint recognition regions.

19. The fingerprint recognition method of claim 12, further comprising:

performing a specified function based on the biometric information of the object corresponding to a user's stored biometric information.

20. The fingerprint recognition method of claim 12, wherein the first guide structure includes the plurality of lenses corresponding to the plurality of sub-fingerprint recognition regions, and wherein the second guide structure includes one lens.

* * * * *